(12) United States Patent
Alumot et al.

(10) Patent No.: US 11,022,566 B1
(45) Date of Patent: Jun. 1, 2021

(54) EXAMINATION OF A SEMICONDUCTOR SPECIMEN

(71) Applicant: Applied Materials Israel Ltd., Rehovot (IL)

(72) Inventors: Dror Alumot, Tel Aviv (IL); Shalom Elkayam, Ramla (IL); Shaul Cohen, Irus (IL)

(73) Assignee: APPLIED MATERIALS ISRAEL LTD., Rehovot (IL)

( * ) Notice: Subject to any disclaimer, the term of this patent is extended or adjusted under 35 U.S.C. 154(b) by 0 days.

(21) Appl. No.: 16/836,606

(22) Filed: Mar. 31, 2020

(51) Int. Cl.

| | |
|---|---|
| *G01N 21/95* | (2006.01) |
| *G06F 30/3308* | (2020.01) |
| *G06F 30/398* | (2020.01) |
| *H01L 21/67* | (2006.01) |
| *G06T 7/13* | (2017.01) |
| *G06T 7/136* | (2017.01) |
| *G06T 7/00* | (2017.01) |
| *G06F 119/02* | (2020.01) |

(52) U.S. Cl.
CPC ..... *G01N 21/9503* (2013.01); *G06F 30/3308* (2020.01); *G06F 30/398* (2020.01); *G06T 7/0006* (2013.01); *G06T 7/13* (2017.01); *G06T 7/136* (2017.01); *H01L 21/67288* (2013.01); *G06F 2119/02* (2020.01); *G06T 2207/20081* (2013.01); *G06T 2207/30148* (2013.01)

(58) Field of Classification Search
CPC ....... G01N 21/9503; G06T 7/136; G06T 7/13; G06T 7/0006; G06T 2207/20081; G06T 2207/30148; G06F 30/398; G06F 30/3308; G06F 2119/02; H01L 21/67288
USPC ........................................................ 716/112
See application file for complete search history.

(56) References Cited

U.S. PATENT DOCUMENTS

| | | | | |
|---|---|---|---|---|
| 2008/0250384 | A1* | 10/2008 | Duffy | G03F 7/7065 716/55 |
| 2012/0098954 | A1 | 4/2012 | Yamaguchi et al. | |
| 2019/0073566 | A1* | 3/2019 | Brauer | G06K 9/6262 |
| 2019/0080447 | A1* | 3/2019 | Shkalim | G06T 7/0006 |
| 2019/0257767 | A1* | 8/2019 | Shaubi | G06T 7/174 |
| 2019/0294923 | A1* | 9/2019 | Riley | G06K 9/6256 |
| 2020/0020092 | A1 | 1/2020 | Fang et al. | |
| 2020/0234428 | A1* | 7/2020 | George | G06K 9/6267 |
| 2020/0242395 | A1* | 7/2020 | Kumar | G06T 5/50 |
| 2020/0242733 | A1* | 7/2020 | Kumar | G06N 20/00 |

OTHER PUBLICATIONS

PCT International Search Report and Written Opinion for International Application No. PCT/US2020/051145, dated Jan. 29, 2021, 10 pages.

* cited by examiner

*Primary Examiner* — Suresh Memula
(74) *Attorney, Agent, or Firm* — Lowenstein Sandler LLP

(57) ABSTRACT

There is provided a system and method of examination of a semiconductor specimen using an examination recipe. The method includes obtaining a registered image pair, for each design-based structural element associated with a given layer, calculating an edge attribute, using a trained classifier to determine a class of the design-based structural element, and generating a layer score usable to determine validity of the registered image pair. There is also provided a system and method of generating the examination recipe usable for examination of a semiconductor specimen.

29 Claims, 13 Drawing Sheets

EXAMINATION OF A SEMICONDUCTOR SPECIMEN

TECHNICAL FIELD

The presently disclosed subject matter relates, in general, to the field of examination of a specimen, and more specifically, to examination of a semiconductor specimen using an examination recipe.

BACKGROUND

Current demands for high density and performance associated with ultra large scale integration of fabricated devices require submicron features, increased transistor and circuit speeds, and improved reliability. Such demands require formation of device features with high precision and uniformity, which, in turn, necessitates careful monitoring of the fabrication process, including automated examination of the devices while they are still in the form of semiconductor wafers.

By way of non-limiting example, run-time examination can employ a two phase procedure, e.g. inspection of a specimen followed by review of sampled locations of potential defects. During the first phase, the surface of a specimen is inspected at high-speed and relatively low-resolution. In the first phase, a defect map is produced to show suspected locations on the specimen having high probability of a defect. During the second phase, at least some of the suspected locations are more thoroughly analyzed with relatively high resolution. In some cases both phases can be implemented by the same inspection tool, and, in some other cases, these two phases are implemented by different inspection tools.

Examination processes are used at various steps during semiconductor fabrication to detect and classify defects on specimens, as well as perform metrology related operations. Effectiveness of examination can be increased by automatization of process(es) as, for example, Automatic Defect Classification (ADC), Automatic Defect Review (ADR), image segmentation, etc.

SUMMARY

In accordance with certain aspects of the presently disclosed subject matter, there is provided a system of examination of a semiconductor specimen using an examination recipe, the system comprising a processor and memory circuitry (PMC) configured to: obtain a registered image pair including a first image captured by an examination tool and representative of at least a portion of the semiconductor specimen, and a second image generated based on design data characterizing the at least portion of the specimen, the second image informative of one or more design-based structural elements presented in the design data and a respective layer associated with each design-based structural element; for each design-based structural element associated with a given layer: calculate an edge attribute associated with the design-based structural element and indicative of estimated existence of an edge of an image-based structural element in the first image at a location of an edge of a design-based structural element in the second image; and use a trained classifier comprised in the examination recipe to determine a class of the design-based structural element based on the edge attribute associated therewith, the class indicative of validity of registration between the first image and the second image at the location of the design-based structural element; and generate a layer score for the given layer based on the class of each design-based structural element associated with the given layer, the score usable to determine validity of the registered image pair based on a layer threshold predetermined in the examination recipe.

In addition to the above features, the system according to this aspect of the presently disclosed subject matter can comprise one or more of features (i) to (vi) listed below, in any desired combination or permutation which is technically possible:

(i). The first image can be a high-resolution image captured by a review tool.

(ii). The second image can be generated by performing simulation on the design data.

(iii). The PMC can be further configured to, for each design-based structural element associated with the given layer: calculate one or more gray level profiles along one or more specific directions at a location in the first image which corresponds to a location of the design-based structural element in the second image; and calculate one or more profile attributes associated with the design-based structural element and each indicative of a difference between a respective gray level profile thereof and a respective baseline gray level profile comprised in the examination recipe, the respective baseline gray level profile being calculated along a respective specific direction for a family of design-based structural elements which the design-based structural element belongs to; wherein the using a trained classifier to determine a class is based on the edge attribute and the one or more profile attributes associated therewith.

(iv). The PMC can be configured to calculate the edge attribute by applying a statistical test between two pixel populations from both sides of the edge of the design-based structural element in the first image, and determining a separation between the two pixel populations based on result of the statistical test.

(v). The layer score can be a percentage of the design-based structural elements that are classified as validly registered.

(vi). The second image can be informative of one or more design-based structural elements associated with a plurality of layers, and the calculating, using and generating are performed for each of the plurality of layers, giving rise to a plurality of layer scores, and wherein the PMC is further configured to determine validity of the registered image pair based on the plurality of layer scores and a plurality of layer thresholds predetermined in the examination recipe.

In accordance with other aspects of the presently disclosed subject matter, there is provided a method of examination of a semiconductor specimen using an examination recipe, the method performed by a processor and memory circuitry (PMC), the method comprising: obtaining a registered image pair including a first image captured by an examination tool and representative of at least a portion of the semiconductor specimen, and a second image generated based on design data characterizing the at least portion of the specimen, the second image informative of one or more design-based structural elements presented in the design data and a respective layer associated with each design-based structural element; for each design-based structural element associated with a given layer: calculating an edge attribute associated with the design-based structural element and indicative of estimated existence of an edge of an image-based structural element in the first image at a location of an edge of a design-based structural element in the second image; and using a trained classifier comprised in the examination recipe to determine a class of the design-based structural element based on the edge attribute associated therewith, the class indicative of validity of registration between the first image and the second image at the location of the design-based structural element; and generating a layer score for the given layer based on the class of each design-based structural element associated with the given layer, the score usable to determine validity of the registered image pair based on a layer threshold predetermined in the examination recipe.

This aspect of the disclosed subject matter can comprise one or more of features (i) to (vi) listed above with respect to the system, mutatis mutandis, in any desired combination or permutation which is technically possible.

In accordance with other aspects of the presently disclosed subject matter, there is provided a non-transitory computer readable medium comprising instructions that, when executed by a computer, cause the computer to perform a method of a method of examination of a semiconductor specimen using an examination recipe, the method performed by a processor and memory circuitry (PMC), the method comprising: obtaining a registered image pair including a first image captured by an examination tool and representative of at least a portion of the semiconductor specimen, and a second image generated based on design data characering the at least portion of the specimen, the second image informative of one or more design-based structural elements presented in the design data and a respective layer associated with each design-based structural element; for each design-based structural element associated with a given layer: calculating an edge attribute associated with the design-based structural element and indicative of estimated existence of an edge of an image-based structural element in the first image at a location of an edge of a design-based structural element in the second image; and using a trained classifier comprised in the examination recipe to determine a class of the design-based structural element based on the edge attribute associated therewith, the class indicative of validity of registration between the first image and the second image at the location of the design-based structural element; and generating a layer score for the given layer based on the class of each design-based structural element associated with the given layer, the score usable to determine validity of the registered image pair based on a layer threshold predetermined in the examination recipe.

This aspect of the disclosed subject matter can comprise one or more of features (i) to (vi) listed above with respect to the system, mutatis mutandis, in any desired combination or permutation which is technically possible.

In accordance with certain aspects of the presently disclosed subject matter, there is provided a system of generating an examination recipe usable for examination of a semiconductor specimen, the system comprising a processor and memory circuitry (PMC) configured to: obtain a training set including: i) a first subset comprising one or more first image pairs, each first image pair including a first image captured by an examination tool and representative of at least a portion of a specimen and a second image generated based on design data characterizing the at least portion of the specimen, the first image and the second image being validly registered, the second image informative of one or more design-based structural elements presented in the design data and a respective layer associated with each design-based structural element; and ii) a second subset comprising one or more second image pairs, each second image pair generated by modifying at least one of the first image and the second image in a respective first image pair in the first subset so that the generated second image pair is invalidly registered; associate each of one or more design-based structural elements in a second image of each image pair of the training set with a label indicative of validity of registration; for each design-based structural element, calculate an edge attribute associated with the design-based structural element and indicative of estimated existence of an edge of an image-based structural element in the first image at a location of an edge of a design-based structural element in the second image; train a classifier using the edge attribute associated with each design-based structural element associated with a given layer and the label thereof to determine validity of registration between the first image and the second image at the location of the design-based structural element; use the trained classifier to determine a class for each design-based structural element associated with the given layer of each image pair based on the edge attribute associated therewith, and generating a layer score for the given layer based on the determined class for each design-based structural element; generate a layer threshold based on the layer score of the given layer of each image pair of the training set; and include the trained classifier and the layer threshold associated with the given layer in the examination recipe.

In addition to the above features, the system according to this aspect of the presently disclosed subject matter can comprise one or more of features (i) to (vi) listed below, in any desired combination or permutation which is technically possible:

(i). At least one second image pair can be generated by modifying content of the first image in a first image pair.

(ii). At least one second image pair can be generated by modifying a relative position between the first image and the second image in a first image pair.

(iii). The PMC can be configured to perform the association based on at least one of: the validity of registration of a corresponding image pair, and the modification in cases where the corresponding image pair is a second image pair.

(iv). The PMC can be further configured to: calculate a gray level profile for each design-based structural element along a specific direction at a location in the first image which corresponds to a location of the design-based structural element in the second image; calculate, along the specific direction, a baseline gray level profile for each family of design-based structural elements among validly registered design-based structural elements, the calculation based on the gray level profile of each design-based structural element in the family; and for each design-based structural element, calculate a profile attribute associated therewith and indicative of difference between the gray level profile thereof and the baseline gray level profile, and wherein the training a classifier and using the trained classifier are based on the edge attribute and the profile attribute associated therewith. The examination recipe can further include the baseline gray level profile.

(v). A plurality of baseline gray level profiles can be calculated for each family along a plurality of specific directions and are included in the examination recipe.

(vi). The second image in each image pair can be informative of one or more design-based structural elements associated with a plurality of layers, and the associating, calculating, training, using and including can be performed for each of the plurality of layers, giving rise to a plurality of examination recipes corresponding to the plurality of layers.

In accordance with other aspects of the presently disclosed subject matter, there is provided a method of generating an examination recipe usable for examination of a semiconductor specimen, the method comprising: obtaining a training set including i) a first subset comprising one or more first image pairs, each first image pair including a first image captured by an examination tool and representative of at least a portion of a specimen and a second image generated based on design data charactering the at least portion of the specimen, the first image and the second image being validly registered, the second image informative of one or more design-based structural elements presented in the design data and a respective layer associated with each design-based structural element; and ii) a second subset comprising one or more second image pairs, each second image pair generated by modifying at least one of the first image and the second image in a respective first image pair in the first subset so that the generated second image pair is invalidly registered; associating each of one or more design-based structural elements in a second image of each image pair of the training set with a label indicative of validity of registration; for each design-based structural element, calculating an edge attribute associated with the design-based structural element and indicative of estimated existence of an edge of an image-based structural element in the first image at a location of an edge of a design-based structural element in the second image; training a classifier using the edge attribute associated with each design-based structural element associated with a given layer and the label thereof to determine validity of registration between the first image and the second image at the location of the design-based structural element; using the trained classifier to determine a class for each design-based structural element associated with the given layer of each image pair based on the edge attribute associated therewith, and generating a layer score for the given layer based on the determined class for each design-based structural element; generating a layer threshold based on the layer score of the given layer of each image pair of the training set; and including the trained classifier and the layer threshold associated with the given layer in the examination recipe.

This aspect of the disclosed subject matter can comprise one or more of features (i) to (vi) listed above with respect to the system, mutatis mutandis, in any desired combination or permutation which is technically possible.

In accordance with other aspects of the presently disclosed subject matter, there is provided a non-transitory computer readable medium comprising instructions that, when executed by a computer, cause the computer to perform a method of a method of generating an examination recipe usable for examination of a semiconductor specimen, the method comprising: obtaining a training set including: i) a first subset comprising one or more first image pairs, each first image pair including a first image captured by an examination tool and representative of at least a portion of a specimen and a second image generated based on design data charactering the at least portion of the specimen, the first image and the second image being validly registered, the second image informative of one or more design-based structural elements presented in the design data and a respective layer associated with each design-based structural element; and ii) a second subset comprising one or more second image pairs, each second image pair generated by modifying at least one of the first image and the second image in a respective first image pair in the first subset so that the generated second image pair is invalidly registered; associating each of one or more design-based structural elements in a second image of each image pair of the training set with a label indicative of validity of registration; for each design-based structural element, calculating an edge attribute associated with the design-based structural element and indicative of estimated existence of an edge of an image-based structural element in the first image at a location of an edge of a design-based structural element in the second image; training a classifier using the edge attribute associated with each design-based structural element associated with a given layer and the label thereof to determine validity of registration between the first image and the second image at the location of the design-based structural element; using the trained classifier to determine a class for each design-based structural element associated with the given layer of each image pair based on the edge attribute associated therewith, and generating a layer score for the given layer based on the determined class for each design-based structural element; generating a layer threshold based on the layer score of the given layer of each image pair of the training set; and including the trained classifier and the layer threshold associated with the given layer in the examination recipe.

This aspect of the disclosed subject matter can comprise one or more of features (i) to (vi) listed above with respect to the system, mutatis mutandis, in any desired combination or permutation which is technically possible.

BRIEF DESCRIPTION OF THE DRAWINGS

In order to understand the disclosure and to see how it may be carried out in practice, embodiments will now be described, by way of non-limiting example only, with reference to the accompanying drawings, in which.

DETAILED DESCRIPTION OF THE DRAWINGS

Figure 1A:
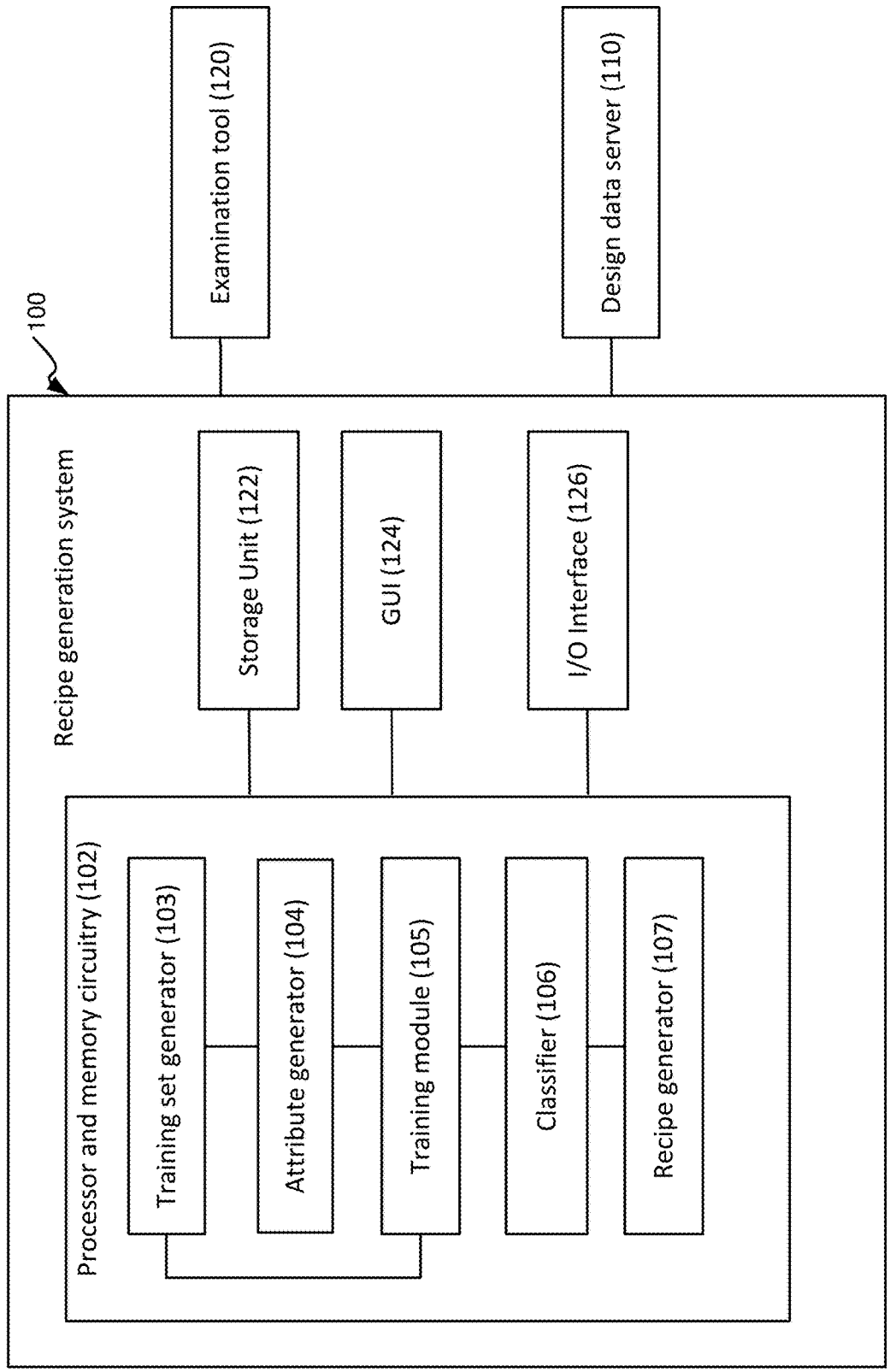
FIG. 1A illustrates a functional block diagram of a recipe generation system in accordance with certain embodiments of the presently disclosed subject matter.

In the following detailed description, numerous specific details are set forth in order to provide a thorough understanding of the disclosure. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "examining", "obtaining", "calculating", "using", "generating", "determining", "associating", "training", "including", "modifying", "performing" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the examination system, the recipe generation system and respective parts thereof disclosed in the present application.

The terms "non-transitory memory" and "non-transitory storage medium" used herein should be expansively construed to cover any volatile or non-volatile computer memory suitable to the presently disclosed subject matter.

The term "specimen" used in this specification should be expansively construed to cover any kind of wafer, masks, and other structures, combinations and/or parts thereof used for manufacturing semiconductor integrated circuits, magnetic heads, flat panel displays, and other semiconductor-fabricated articles.

The term "examination" used in this specification should be expansively construed to cover any kind of metrology-related operations as well as operations related to detection and/or classification of defects in a specimen during its fabrication. Examination is provided by using non-destructive examination tools during or after manufacture of the specimen to be examined. By way of non-limiting example, the examination process can include runtime scanning (in a single or in multiple scans), sampling, reviewing, measuring, classifying and/or other operations provided with regard to the specimen or parts thereof using the same or different inspection tools. Likewise, examination can be provided prior to manufacture of the specimen to be examined and can include, for example, generating an examination recipe(s) and/or other setup operations. It is noted that, unless specifically stated otherwise, the term "examination" or its derivatives used in this specification are not limited with respect to resolution or size of an inspection area. A variety of non-destructive examination tools includes, by way of non-limiting example, scanning electron microscopes, atomic force microscopes, optical inspection tools, etc.

The term "defect" used in this specification should be expansively construed to cover any kind of abnormality or undesirable feature formed on or within a specimen.

The term "design data" used in the specification should be expansively construed to cover any data indicative of hierarchical physical design (layout) of a specimen. Design data can be provided by a respective designer and/or can be derived from the physical design (e.g. through complex simulation, simple geometric and Boolean operations, etc.). Design data can be provided in different formats as, by way of non-limiting examples, GDSII format, OASIS format, etc. Design data can be presented in vector format, grayscale intensity image format, or otherwise.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

Bearing this in mind, attention is drawn to FIG. 1A illustrating a functional block diagram of a recipe generation system in accordance with certain embodiments of the presently disclosed subject matter.

Figure 1B:
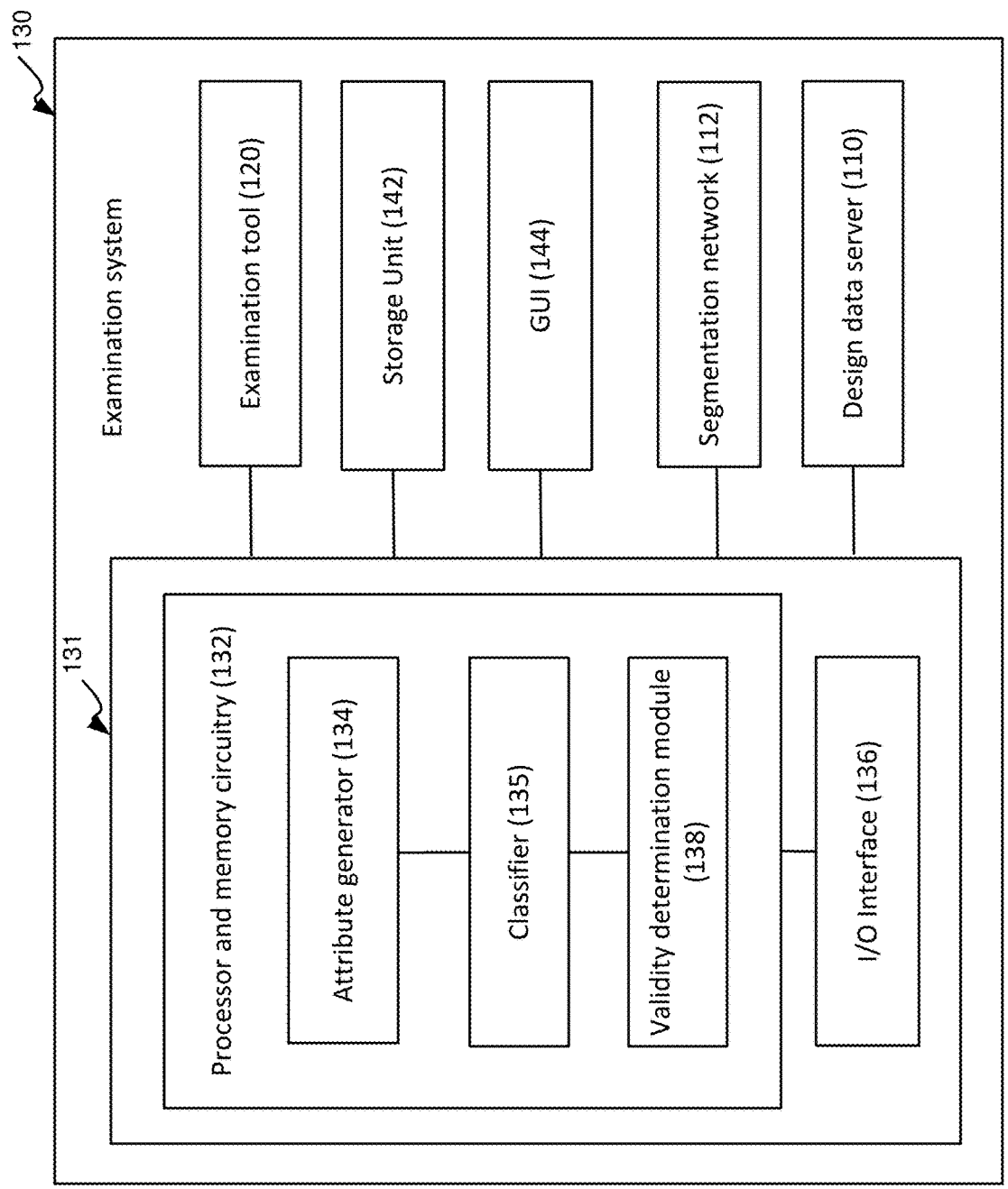
FIG. 1B illustrates a functional block diagram of an examination system in accordance with certain embodiments of the presently disclosed subject matter.

The recipe generation system 100 illustrated in FIG. 1A can be used for generating an examination recipe usable by the examination system 130 (as illustrated in FIG. 1B) for examination of a semiconductor specimen (e.g. of a wafer and/or parts thereof). The illustrated system 100 can be a computer-based system capable of automatically generating an examination recipe based on a training set comprising image pairs representative of at least part of the specimen, as will be described below in further detail with reference to FIG. 2. According to certain embodiments of the presently disclosed subject matter, system 100 can be operatively connected to one or more examination tools 120 configured to capture one or more images of the specimen. Details of the examination tools and the images captured thereby are described in further detail with reference to FIG. 1B. According to certain embodiments, the system 100 can be further operatively connected to a design data server 110 (e.g., CAD server) configured to store and provide design data characterizing the specimen. The design data of the specimen can be in any of the following formats: the physical design layout (e.g., CAD clip) of the specimen, a raster image, and a simulated image derived from the design layout. The images and the design data of the specimen can be pre-collected and stored in a storage unit 122, and can be used for generation of the training set.

System 100 includes a processor and memory circuitry (PMC) 102 operatively connected to a hardware-based I/O interface 126. PMC 102 is configured to provide all processing necessary for operating the system 101 as further detailed with reference to FIG. 2, and comprises a processor (not shown separately) and a memory (not shown separately). The processor of PMC 102 can be configured to execute several functional modules in accordance with computer-readable instructions implemented on a non-transitory computer-readable memory comprised in the PMC. Such functional modules are referred to hereinafter as comprised in the PMC.

According to certain embodiments of the presently disclosed subject matter, functional modules comprised in PMC 102 can include a training set generator 103, an attribute generator 104, a training module 105, a classifier 106, and a recipe generator 107. The training set generator 103 can be configured to obtain a training set comprising a first subset comprising one or more first image pairs and a second subset comprising one or more second image pairs. Each first image pair includes two properly/validly registered images: a first image captured by an examination tool and representative of at least a portion of a specimen, and a second image generated based on design data charactering the at least portion of the specimen. Each second image pair is artificially/synthetically generated based on a corresponding first image pair, e.g., by modifying at least one of the first image and the second image in the first image pair, so that the two images in the generated second image pair are invalidly registered. In some cases, the training set can be pre-generated and stored in the storage unit 122, and can be retrieved by the training set generator 103 from the storage unit 122. In some other cases, the training set can be generated by system 100. By way of example, the training set generator 103 can be configured to receive, via I/O interface 126, the captured images from the examination tool 120 and the corresponding design data from the design data server 110, and perform image registration therebetween. The training set generator 103 can be further configured to generate the second subset of image pairs. The image registration, as well as the generation of the second subset, are described in further detail below with reference to FIG. 2.

Each second image can be informative of one or more design-based structural elements presented in the design data and a respective layer associated with each design-based structural element. The training set generator 103 can be further configured to associate each of one or more design-based structural elements in a second image of each image pair of the training set with a label indicative of validity of registration.

For each design-based structural element, the attribute generator 104 can be configured to calculate an edge attribute associated with the design-based structural element which is indicative of estimated existence of an edge of an image-based structural element in the first image at a location of an edge of a design-based structural element in the second image. The training module 105 can be configured to train a classifier 106 using the label of each design-based structural element and the edge attribute associated therewith to determine validity of registration between the first image and the second image at the location of the design-based structural element.

The recipe generator 107 can be configured to use the trained classifier to determine a class for each of one or more design-based structural elements associated with a given layer of each image pair based on the edge attribute associated therewith, and generate a layer score for the given layer based on the determined class of the one or more design-based structural elements. The recipe generator 107 can be further configured to generate a layer threshold based on the layer score of the given layer of each image pair of the training set, and include the trained classifier and the layer threshold in the examination recipe.

Operation of system 100, PMC 102 and the functional modules therein will be further detailed with reference to FIG. 2.

According to certain embodiments, system 100 can comprise a storage unit 122. The storage unit 122 can be configured to store any data necessary for operating system 100, e.g., data related to input and output of system 100, as well as intermediate processing results generated by system 100. By way of example, the storage unit 122 can be configured to store training images and/or derivatives thereof produced by the examination tool 120. The storage unit 122 can also be configured to store design data characterizing the specimen and/or derivatives thereof. In some embodiments, the storage unit 122 can be configured to store a pre-generated training set as described above. Accordingly, the stored data can be retrieved from the storage unit 122 and provided to the PMC 102 for further processing.

In some embodiments, system 100 can optionally comprise a computer-based graphical user interface (GUI) 124 which is configured to enable user-specified inputs related to system 100. For instance, the user can be presented with a visual representation of the specimen (for example, by a display forming part of GUI 124), including image data and/or design data of the specimen. The user may be provided, through the GUI, with options of defining certain operation parameters, e.g., training configuration parameters. The user may also view the operation results, such as, e.g., the training results, etc., on the GUI.

Those versed in the art will readily appreciate that the teachings of the presently disclosed subject matter are not bound by the system illustrated in FIG. 1A; equivalent and/or modified functionality can be consolidated or divided in another manner and can be implemented in any appropriate combination of software with firmware and/or hardware.

It is noted that the recipe generation system illustrated in FIG. 1A can be implemented in a distributed computing environment, in which the aforementioned functional modules shown in FIG. 1A can be distributed over several local and/or remote devices, and can be linked through a communication network. It is further noted that in other embodiments at least part of the storage unit 122 and/or GUI 124 can be external to the system 100 and operate in data communication with system 100 via I/O interface 126. System 100 can be implemented as stand-alone computer(s) to be used in conjunction with the examination tools. Alternatively, in some cases, the respective functions of the system 100 can, at least partly, be integrated with one or more examination tools 120.

Attention is directed to FIG. 1B, illustrating a functional block diagram of an examination system in accordance with certain embodiments of the presently disclosed subject matter.

The examination system 130 illustrated in FIG. 1B can be used for examination of a semiconductor specimen (e.g. of a wafer and/or parts thereof) as a part of the specimen fabrication process. The system 130 can examine the specimen using an examination recipe as generated by the recipe generation system 100 as illustrated in FIG. 1A. The illustrated examination system 130 can comprise a computer-based system 131 capable of automatically determining examination related information using images obtained during specimen fabrication (referred to hereinafter as fabrication process (FP) images or images) and design data characterizing the specimen. The system 131 can be generally referred to as an FPEI (Fabrication Process Examination Information) system. According to certain embodiments of the presently disclosed subject matter, the system 131 can be configured to determine registration validity of image pairs, as will be described below in further detail with reference to FIG. 3. System 131 can be operatively connected to one or more examination tools 120. The examination tools 120 are configured to capture FP images and/or to review the captured FP image(s) and/or to enable or provide measurements related to the captured image(s). The system 131 can be further operatively connected to a design data server 110 and a storage unit 142.

By way of example, FP images (also referred to herein as images) can be selected from a plurality of images of a specimen (e.g. wafer or parts thereof) captured during the manufacturing process, derivatives of the captured images obtained by various pre-processing stages (e.g. images of a part of a wafer or a photomask captured by SEM or an optical inspection system, SEM images roughly centered around the defect to be classified by ADC, SEM images of larger regions in which the defect is to be localized by ADR, registered images of different examination modalities corresponding to the same mask location, segmented images, height map images, etc.). It is to be noted that in some cases the images can include image data (e.g. captured images, processed images, etc.) and associated numeric data (e.g. metadata, hand-crafted attributes, etc.). It is further noted that image data can include data related to a layer of interest and/or to one or more layers of the specimen.

The term "examination tool(s)" used herein should be expansively construed to cover any tools that can be used in examination-related processes, including, by way of non-limiting example, imaging, scanning (in a single or in multiple scans), sampling, reviewing, measuring, classifying and/or other processes provided with regard to the specimen or parts thereof. The one or more examination tools 120 can include one or more inspection tools and/or one or more review tools. In some cases, at least one of the examination tools 120 can be an inspection tool configured to scan a specimen (e.g., an entire wafer, an entire die or portions thereof) to capture inspection images (typically, at relatively high-speed and/or low-resolution) for detection of potential defects. In some cases, at least one of the examination tools 120 can be a review tool, which is configured to capture review images of at least some of the defects detected by inspection tools for ascertaining whether a potential defect is indeed a defect. Such a review tool is usually configured to inspect fragments of a die, one at a time (typically, at relatively low-speed and/or high-resolution). Inspection tool and review tool can be different tools located at the same or at different locations, or a single tool operating in two different modes. In some cases at least one examination tool can have metrology capabilities.

Without limiting the scope of the disclosure in any way, it should also be noted that the examination tools 120 can be implemented as inspection machines of various types, such as optical imaging machines, electron beam inspection machines and so on. In some cases the same examination tool can provide low-resolution image data and high-resolution image data.

System 131 includes a processor and memory circuitry (PMC) 132 operatively connected to a hardware-based I/O interface 136. PMC 132 is configured to provide all processing necessary for operating the system 131 as further detailed with reference to FIG. 3 and comprises a processor (not shown separately) and a memory (not shown separately). The processor of PMC 132 can be configured to execute several functional modules in accordance with computer-readable instructions implemented on a non-transitory computer-readable memory comprised in the PMC. Such functional modules are referred to hereinafter as comprised in the PMC.

According to certain embodiments, functional modules comprised in PMC 132 can include an attribute generator 134, a classifier 135, and a validity determination module 138. The PMC 132 can be configured to obtain, via the I/O interface 136, in runtime (i.e., production time/phase), a registered image pair including a first image captured by an examination tool and representative of at least a portion of the semiconductor specimen, and a second image generated based on design data charactering the at least portion of the specimen. The second image can be informative of one or more design-based structural elements presented in the design data and a respective layer associated with each design-based structural element. In some embodiments, the image registration between the first image and the second image can be performed by system 131 upon receiving, via I/O interface 136, the captured images from the examination tool 120 and the corresponding design data from the design data server 110. Alternatively, the image registration, or at least part of the functionality thereof, can be performed externally (e.g., by a system external to system 131) and the registration result (i.e., the registered image pair) can be provided to system 131 for further processing.

For each design-based structural element associated with a given layer, the attribute generator 134 can be configured to calculate an edge attribute associated with the design-based structural element which is indicative of estimated existence of an edge of an image-based structural element in the first image at a location of an edge of a design-based structural element in the second image. The classifier 135 (i.e., a trained classifier) comprised in the examination recipe can be used to determine a class of the design-based structural element based on the edge attribute associated therewith. The class is indicative of validity of registration between the first image and the second image at the location of the design-based structural element. The validity determination module 138 can be configured to generate a layer score for the given layer based on the class of each design-based structural element associated with the given layer. The score is usable to determine validity of the registered image pair based on a threshold predetermined in the examination recipe.

Operation of system 130, system 131, PMC 132 and the functional modules therein will be further detailed with reference to FIG. 3.

According to certain embodiments, system 130 can comprise a storage unit 142. The storage unit 142 can be configured to store any data necessary for operating system 130, e.g., data related to input and output of system 130, as well as intermediate processing results generated by system 130. By way of example, the storage unit 142 can be configured to store images and/or derivatives thereof produced by the examination tool 120. The storage unit 142 can also be configured to store design data characterizing the specimen and/or derivatives thereof. In some embodiments, the storage unit 142 can be configured to store pre-generated registered image pairs as described above. Accordingly, the stored data can be retrieved from the storage unit 142 and provided to the PMC 132 for further processing.

In some embodiments, system 130 can optionally comprise a computer-based graphical user interface (GUI) 144 which is configured to enable user-specified inputs related to system 130. For instance, the user can be presented with a visual representation of the specimen (for example, by a display forming part of GUI 144), including image data and/or design data of the specimen. The user may be provided, through the GUI, with options of defining certain operation parameters. The user may also view the operation results, such as, e.g., the examination results, etc., on the GUI. In some cases, system 131 can be further configured to send, via I/O interface 126, the results (or part thereof) to the storage unit 142, and/or the examination tool(s) 120, and/or external systems (e.g. Yield Management System (YMS) of a FAB).

According to certain embodiments, the system 131 can be operatively connected with a segmentation network 112 configured to perform segmentation on the examination results of system 131. The segmentation network 112 can be a deep learning model, such as deep neural network (DNN) which includes layers organized in accordance with respective DNN architecture. By way of non-limiting example, the layers of DNN can be organized in accordance with Convolutional Neural Network (CNN) architecture, Recurrent Neural Network architecture, Recursive Neural Networks architecture, Generative Adversarial Network (GAN) architecture, or otherwise. Optionally, at least some of the layers can be organized in a plurality of DNN sub-networks. Each layer of DNN can include multiple basic computational elements (CE) typically referred to in the art as dimensions, neurons, or nodes.

Generally, computational elements of a given layer can be connected with CEs of a preceding layer and/or a subsequent layer. Each connection between a CE of a preceding layer and a CE of a subsequent layer is associated with a weighting value. A given CE can receive inputs from CEs of a previous layer via the respective connections, each given connection being associated with a weighting value which can be applied to the input of the given connection. The weighting values can determine the relative strength of the connections and thus the relative influence of the respective inputs on the output of the given CE. The given CE can be configured to compute an activation value (e.g. the weighted sum of the inputs) and further derive an output by applying an activation function to the computed activation. It is noted that the teachings of the presently disclosed subject matter are not bound by specific architecture of the DNN.

In some embodiments, system 131 can further comprise the segmentation network 112 or part thereof. In other words, the respective functions of the segmentation network 112 can, at least partly, be integrated within system 131.

Additionally to the system 131, the examination system 100 can comprise one or more examination modules, such as, e.g., defect detection module and/or Automatic Defect Review Module (ADR) and/or Automatic Defect Classification Module (ADC) and/or metrology-related module and/or other examination modules. Such examination modules can utilize the output of the system 131 and/or the output of the segmentation network 112 for examination of a semiconductor specimen. In some cases, the one or more examination modules can be at least partially integrated with the one or more examination tools 120.

Those versed in the art will readily appreciate that the teachings of the presently disclosed subject matter are not bound by the system illustrated in FIG. 1B; equivalent and/or modified functionality can be consolidated or divided in another manner and can be implemented in any appropriate combination of software with firmware and/or hardware.

It is noted that the recipe generation system illustrated in FIG. 1B can be implemented in a distributed computing environment, in which the aforementioned functional modules shown in FIG. 1B can be distributed over several local and/or remote devices, and can be linked through a communication network. It is further noted that in another embodiments at least some of the examination tools 120, storage unit 142 and/or GUI 144 can be external to the system 130 and operate in data communication with system 130 via I/O interface 126. System 130 can be implemented as stand-alone computer(s) to be used in conjunction with the examination tools. Alternatively, in some cases, the respective functions of the system 130 can, at least partly, be integrated with one or more examination tools 120, thereby facilitating and enhancing the functionalities of the examination tools 120 in examination related processes.

As described above with reference to FIG. 1B, the examination system 130, which includes the examination tool(s) 120, can be configured to capture one or more images of the specimen and perform examination-related operations, such as, e.g., defect detection, and/or defect review, and/or metrology related operations, etc. According to certain embodiments, the examination system can be configured to obtain the images captured by the examination tool(s) and corresponding design data (e.g., CAD data), and perform registration between the images and CAD data in order to perform further examination operations, such as, e.g., segmentation and metrology measurements etc.

Figure 4:
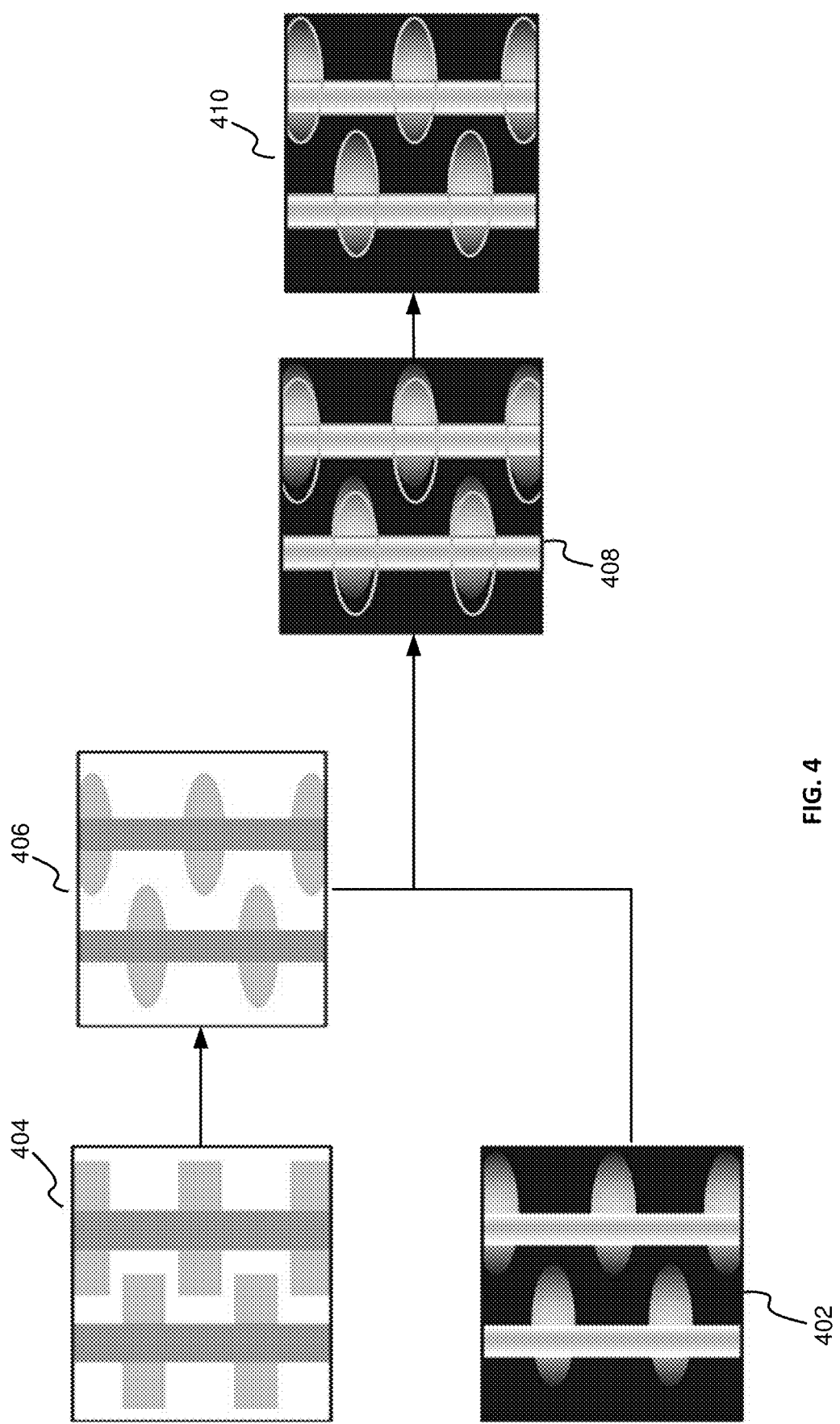
FIG. 4 illustrates an exemplified image registration process in accordance with certain embodiments of the presently disclosed subject matter.

Referring now to FIG. 4, there is illustrated an exemplified image registration process in accordance with certain embodiments of the presently disclosed subject matter.

An FP image 402 (also referred to herein as a first image) can be obtained from an examination tool and be representative of a portion of a wafer. Design data 404 (e.g., a CAD clip) characterizing the same portion of wafer can be obtained from a CAD server. As illustrated in the present example, the CAD clip 404 presents two types of design-based structural elements (e.g., polygons): column-shaped polygons in a first layer, and square-shaped polygons in a second layer. A design-based image 406 (also referred to herein as a second image) can be generated based on the CAD data. For instance, the CAD clip 404 can undergo simulation, giving rise to a simulated CAD image 406. In some cases, such simulation can take into consideration the difference between the design-based structural elements and the corresponding image-based structural elements. For instance, in some cases, due to factors such as, e.g., the variances of the manufacturing process (e.g., printing the design patterns on the wafer by an optical lithography tool), and/or the constraints of the design tool, etc., a design-based structural element such as, e.g., the square-shaped polygon, may actually appear in the image in the shape of an ellipse, as illustrated in the simulated CAD image 406. The simulation can take such differences into consideration and generate a simulated image including the structural element with a simulated shape as it would have appeared in the image. As seen, the shapes of polygons in the simulated CAD image 406 are more consistent with the ones of the captured image 402 as compared to the CAD data 404.

The FP image 402 and the simulated CAD image 406 can be registered in order to align the CAD image with the FP image. By way of example, a global registration can be performed which aligns the two images globally in terms of a relative position therebetween. The relative position between the CAD image with the FP image can be caused, for instance, by navigation issues of the examination tool when capturing the FP image. By way of another example, in some cases, the registration can be performed in two stages: the global registration as described above, and a per-layer registration which aligns the polygons respectively in each layer of the specimen. FIG. 4 illustrates such a two-stage registration process. As illustrated, after the global registration, an image pair that is globally registered is shown in 408 in which the column-shaped polygons are properly registered (e.g., the corresponding polygons in both images match), whereas there appears discrepancy (e.g., a relative shift) between the positions of the ellipse-shaped polygons in the two images. In the present example, this can be caused by, e.g., overlay issues during the manufacturing process, which leads to a relative shift between the two layers in the fabricated specimen as compared to the design.

Upon the per-layer registration being performed, the ellipse-shaped polygons in the second layer of the simulated CAD image 406 are shifted accordingly so as to match the corresponding polygons in the FP image, giving rise to the registered image pair 410.

According to certain embodiments of the present disclosure, after registration (e.g., the global registration, or the two-stage registration as described above), an image pair in which an FP image and a corresponding design-based image are aligned and per-layer structural elements between the two images are matched (e.g., meet a predefined matching criterion) is referred to herein as being validly/properly registered (such an image pair is also referred to as "a good image pair"). When performing further examination operations on the validly registered image pair, such as, e.g., segmentation and metrology measurements, etc., users can be assured and feel confident that the examination results obtained (e.g., the measurements, such as, overlay, CD, etc.) are accurate and can be trusted.

Figure 5:
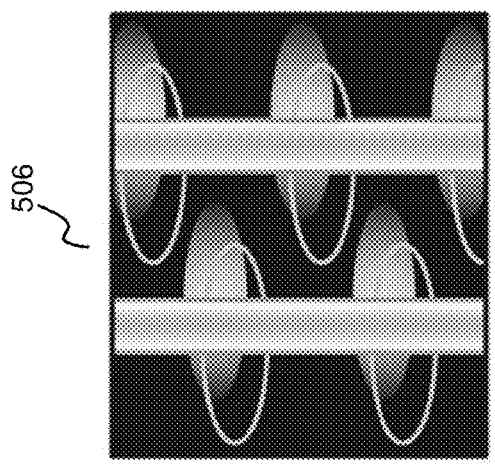
FIG. 5 illustrates a few examples of invalidly registered image pairs in accordance with certain embodiments of the presently disclosed subject matter.
Figure 5:
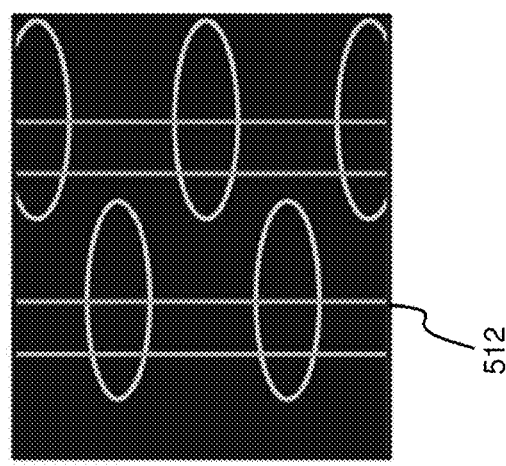
Figure 5:
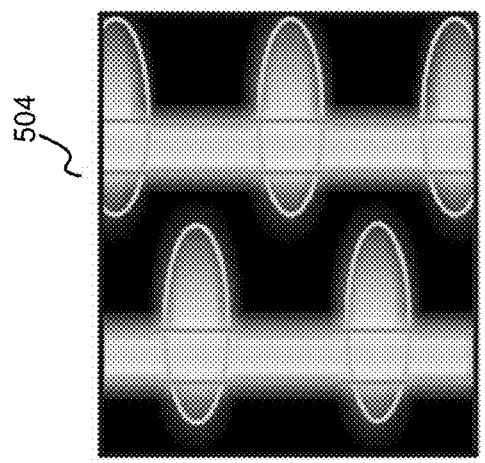
Figure 5:
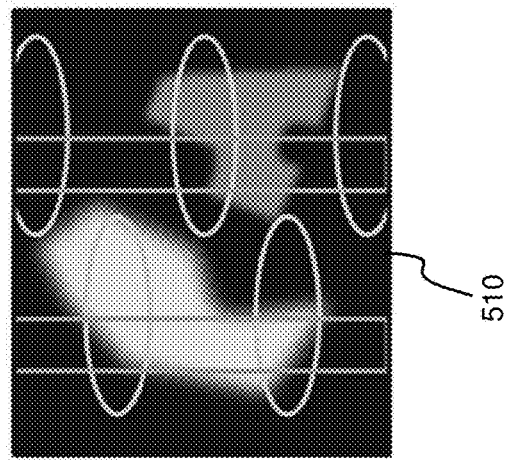
Figure 5:
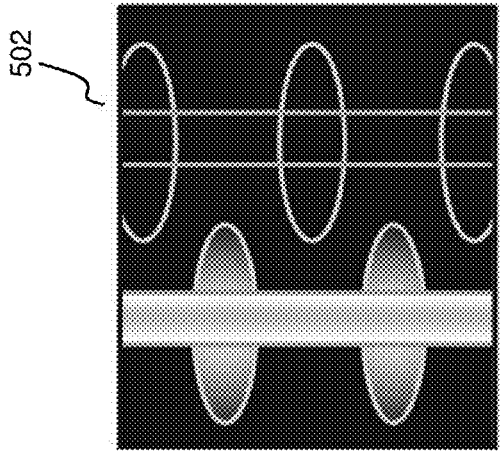
Figure 5:
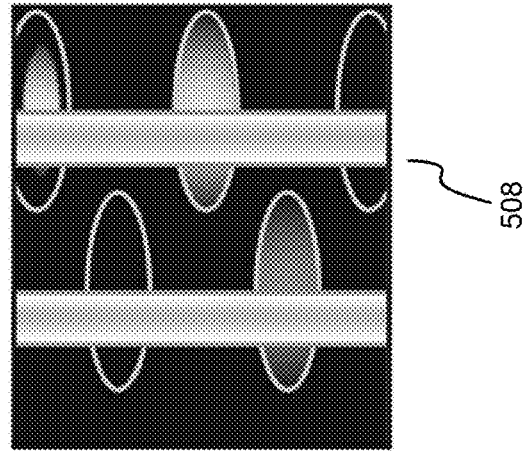

However, in some cases, the image pair is not properly registered even after the registration process as described above, i.e., there still exists a mis-match or discrepancy between the FP image and the corresponding design-based image (e.g., not meeting a predefined matching criterion) after the registration. Such image pairs are referred to herein as invalidly/improperly registered image pairs (also referred to as "faulty image pairs"). Referring now to FIG. 5, there is illustrated a few examples of invalidly registered image pairs in accordance with certain embodiments of the presently disclosed subject matter.

In 502 there is illustrated a mismatch between the FP image and the CAD due to navigation errors. For instance, the examination tool may be navigated incorrectly, thus capturing an FP image from an erred location which does not correspond to the CAD data. In 504 there is illustrated a mismatch between the FP image and CAD due to focus issues. As shown, the FP image in 504 is captured out of focus (e.g., the image polygons have obscure edges), thus not matching the CAD polygons. 506 shows an example of mis-registration of polygons in a certain layer. Specifically, the ellipse-shaped polygons in the FP image and CAD are not properly registered. 508 and 510 show two different examples of mis-pattern in which the patterns in the FP image and the CAD do not match. For instance, due to possible manufacturing errors, in 508 some polygons are missing in the FP image as compared to the CAD data, and in 510 the patterns in the image are completely different from the design. 512 illustrates an example of a bare FP image which does not capture any patterns as compared to the CAD data.

The mismatch/discrepancy between the image and CAD data as exemplified above can be due to various reasons, such as, e.g., examination system issues (e.g., focus issues, navigation errors), algorithmic difficulties (e.g., registration failures), and/or manufacture process failures (e.g., mis-pattern, bare image). Performing further examination operations (such as, e.g., segmentation and metrology measurements, etc.) on such an invalidly registered image pair, without knowing there is a mismatch problem, can result in reporting meaningless results to the user. Such results may provide misleading information for adjusting the manufacturing process, thus in some cases causing severe damages and reducing the user's confidence in the examination system. By way of example, an incorrect overlay measurement (due to invalid registration between the image pair) may mislead future manufacturing processes, thereby producing faulty production wafers.

According to certain statistics, it is shown that about 5% of the sites on a wafer may be associated with such mismatch/discrepancy issues between the image and the corresponding design data. Such sites are also referred to herein as low-confidence sites. Certain examination systems do not provide a filtering mechanism during the examination process to detect such issues. In order to mitigate such issues, the user may manually inspect all sites on the wafer prior-examination, or inspect the examination results for the entire wafer post-examination in order to look for outliers, both of these measures being extremely time-consuming, inefficient and ineffective. In some cases, the user has to iterate over the calibration process of the examination recipe many times until these cases become rare, which significantly increases the Time-to-Recipe (TtR).

According to certain embodiments of the present disclosed subject matter, there is proposed a method of generating an examination recipe capable of detecting such invalid registration issues, and a method of examining a specimen using the examination recipe generated as such, as described in further detail with reference to FIGS. 2 and 3. These methods are machine learning based, with minimal user calibration and interaction.

Figure 2:
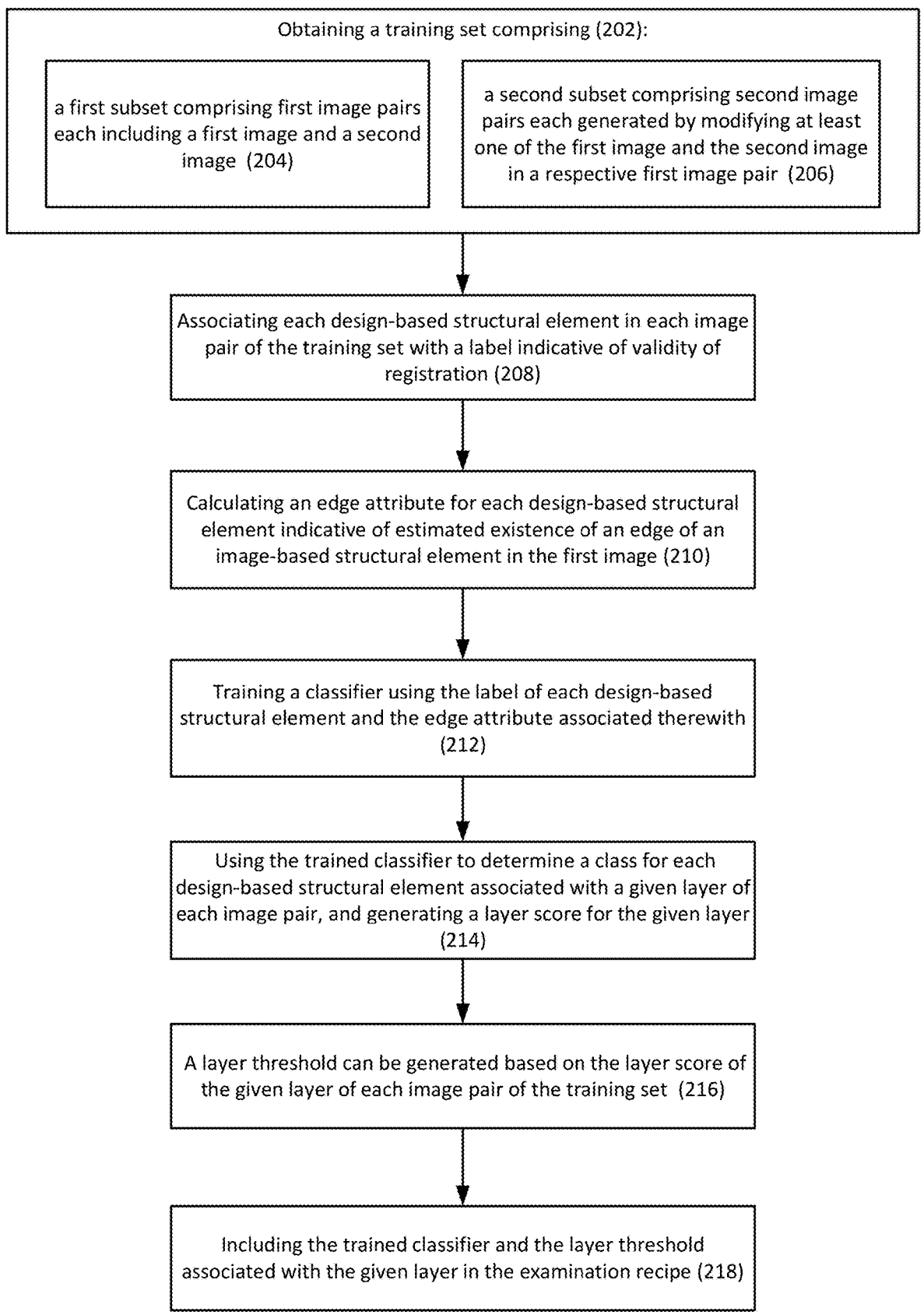
FIG. 2 illustrates a generalized flowchart of generating an examination recipe usable for examination of a semiconductor specimen in accordance with certain embodiments of the presently disclosed subject matter.

Referring to FIG. 2, there is illustrated a generalized flowchart of generating an examination recipe usable for examination of a semiconductor specimen in accordance with certain embodiments of the presently disclosed subject matter.

A training set can be obtained (202) (e.g., by the training set generator 103 via the I/O interface 126 or from the storage unit 122). The training set can include a first subset 204 comprising one or more first image pairs and a second subset 206 comprising one or more second image pairs. Each first image pair in the first subset includes two validly registered images: a first image captured by an examination tool and representative of at least a portion of a specimen, and a second image generated based on design data charactering the at least portion of the specimen. By way of example, the first image can be a FP image captured by an examination tool. In some cases, the first image is a high-resolution image captured by a review tool, such as, e.g., a scanning electron microscope (SEM) image captured by an SEM machine.

The second image can be a simulated image generated by performing simulation on the design data, such as, e.g., a CAD simulated image. As described above, the simulation can take into consideration the difference between the design-based structural element and the corresponding image-based structural element, and generate a simulated image including the structural element with a simulated shape as it would have appeared in the image.

The second image can comprise one or more layers corresponding to the design layers in design data. The second image can be informative of one or more design-based structural elements presented in the design data, and a respective layer associated with each design-based structural element. Each layer can be regarded as a binary image in which the design-based structural elements are separated from the background. The first image and the second image are validly registered. The image registration between the first image and the second image can be performed in a similar manner as described above with reference to FIG. 4.

A structural element used herein can refer to any original object on the image data or design data that has a geometrical shape or geometrical structure with a contour. In some cases, a structural element can refer to a plurality of combined objects forming a pattern. A structural element that is located/presented on the image data can be referred to as an image-based structural element (also referred to as an image structural element or image polygon). A structural element that is located/presented on the design data can be referred to as a design-based structural element (also referred to as design structural element or design polygon or CAD polygon). A structural element can be presented, e.g., in the form of a polygon, as exemplified in FIG. 4. A structural element can be defined by the user, or can be defined automatically, for example using rule-based or machine-learning techniques.

Each design-based structural element can be associated with a respective layer in which the element resides. In some cases, a given layer may contain more than one type of structural element (e.g., each type corresponding to a respective design pattern). In such cases, each design-based structural element can be further associated with a label indicting the type thereof.

The first image pairs comprised in the first subset are validly registered image pairs that are pre-selected, e.g., by the user, from a training database. The user can select and confirm the validity of a number of sites to make sure there is no undesired discrepancy between the image and corresponding CAD data, as described above.

Since invalid/faulty image pairs are, in general, rare in wafers, the present disclosure proposes a method of artificially/synthetically generating such image pairs (i.e., the second image pairs as referred to herein) to constitute a part of the training set. According to certain embodiments, a second image pair can be artificially generated based on a corresponding first image pair. By way of example, a second image pair can be created by modifying at least one of the first image and the second image in a first image pair so that the two images in the generated second image pair are invalidly registered. By way of example, at least one second image pair can be generated by modifying content of the first image in a first image pair. By way of another example, at least one second image pair can be generated by modifying a relative position between the first image and the second image in a first image pair. In some embodiments, for each first image pair, one or more second image pairs can be generated.

Figure 6:
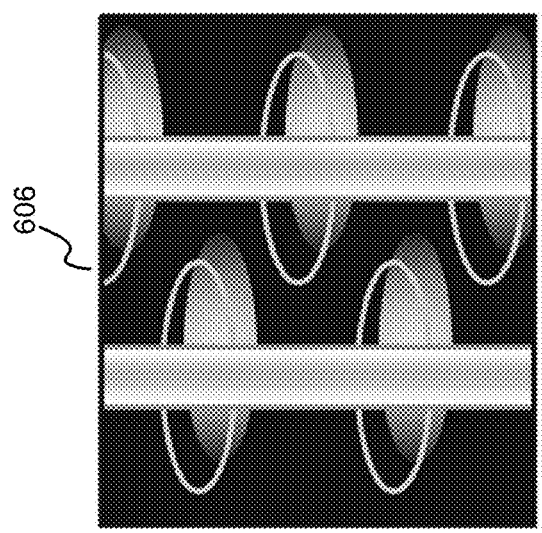
FIG. 6 illustrates a few examples of second image pairs artificially generated based on a first image pair in accordance with certain embodiments of the presently disclosed subject matter.
Figure 6:
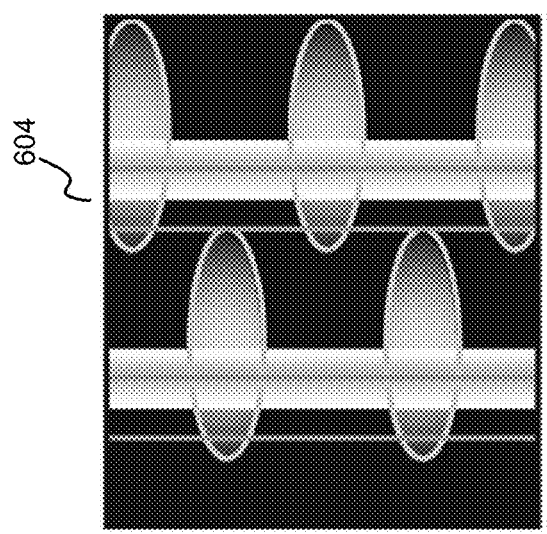
Figure 6:
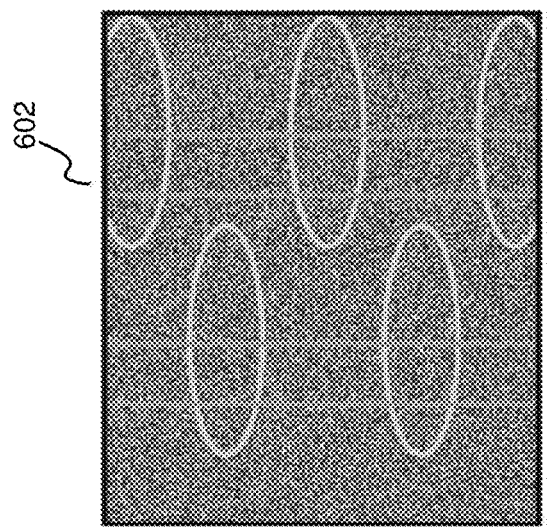

Referring now to FIG. 6, there is illustrated a few examples of second image pairs artificially generated based on a first image pair in accordance with certain embodiments of the presently disclosed subject matter.

In the second image pair illustrated in 602, the content of the original FP image of a first image pair is modified, e.g., is replaced by a bare image (e.g., an image composed of only random noise), while the CAD simulated image remains intact. In 604 and 606, the relative position between the FP image and the CAD simulated image, or part thereof, is modified. Specifically, design-based structural elements in a certain layer of the CAD simulated image are shifted relative to the FP image, while the FP image is unchanged. For instance, In 604, the column-shaped polygons in one layer are shifted towards the left, while the ellipse-shaped polygons in the other layer are not moved. In 606, the ellipse-shaped polygons are shifted towards the left, while the ellipse-shaped polygons in the other layer are not moved. Therefore, in the present example, for one first image pair, three different second image pairs are created.

It is to be noted that the examples shown in FIG. 6 are illustrated for exemplary purposes and should not be regarded as limiting the present disclosure in any way. Other possible ways of modification of the first image and/or second image, such as, e.g., modifying the size and/or shape of one or more of the design-based structural elements in a certain layer, degrading the focus of the FP image, for example by convolving the image with a Gaussian kernel, replacing a section of the FP image with random noise, etc., can be used in addition to, or in lieu of, the above.

In some embodiments, the training set can be pre-generated and stored in the storage unit 122, and can be retrieved by the training set generator 103 during training. In such cases, the functionality (or at least part thereof) of image registration, and/or generation of the second subset, can be performed externally to system 100 and in advance of the presently proposed recipe generation method as described in FIG. 2. In some other embodiments, such functionalities can be performed by system 100 (e.g., by the training set generator 103) and thus can be regarded as part of the current flow of FIG. 2.

Continuing with the description of FIG. 2, once the training set including a first subset and a second subset is obtained, each of one or more design-based structural elements in a second image of each image pair of the training set can be associated (208) (e.g., by the training set generator 103) with a label indicative of validity of registration.

According to certain embodiments, the labeling can be performed based on at least one of the following factors: the validity of registration of a corresponding image pair, and the modification in cases where the corresponding image pair is a second image pair. By way of example, for each of the first image pairs in the first subset which are selected and confirmed by the user as validly registered image pairs, the design-based structural elements in the second image thereof are labeled as validly registered structural elements.

By way of another example, for the second image pairs in the second subset which are artificially generated as invalidly registered image pairs, the labeling depends on the specific modification applied thereof. For instance, in cases where the content of the FP image is modified, such as, e.g., replacing the FP image with a bare image, all the design-based structural elements in the second image thereof are labeled as invalidly registered structural elements. In another example, in cases where the relative position between the first image and the second image is modified, such as, e.g., shifting the polygons in a specific layer of the second image relative to the first image, the shifted polygons in the specific layer are labeled as invalidly registered structural elements, while the polygons in other layers are still labeled as validly registered structural elements. In such ways, all the design-based structural elements in the training set are associated with respective labels indicative of validity of registration thereof.

One or more attributes of the design-based structural elements can be calculated, which, together with the labels associated with the design-based structural elements, are used for training a classifier. Calculation of the attributes is now described below with reference to block 210.

For each design-based structural element, an edge attribute associated with the design-based structural element can be calculated (210) (e.g., by the attribute generator 104). The edge attribute can be indicative of estimated existence of an edge of an image-based structural element in the first image at a location of an edge of a design-based structural element in the second image.

The edge attribute is used as a measure to the existence of a gray level edge (e.g., an edge of an image polygon) in the FP image, at the location of an edge of a CAD polygon in the simulated CAD image. According to certain embodiments, the edge attribute can be calculated by applying a statistical test between two pixel populations from both sides of the edge of the design-based structural element in the first image, and determining separation between the two pixel populations based on results of the statistical test. The separation can indicate if there is indeed an edge existing in the FP image at the estimated location (e.g., the location of the CAD polygon edge).

Figure 7:
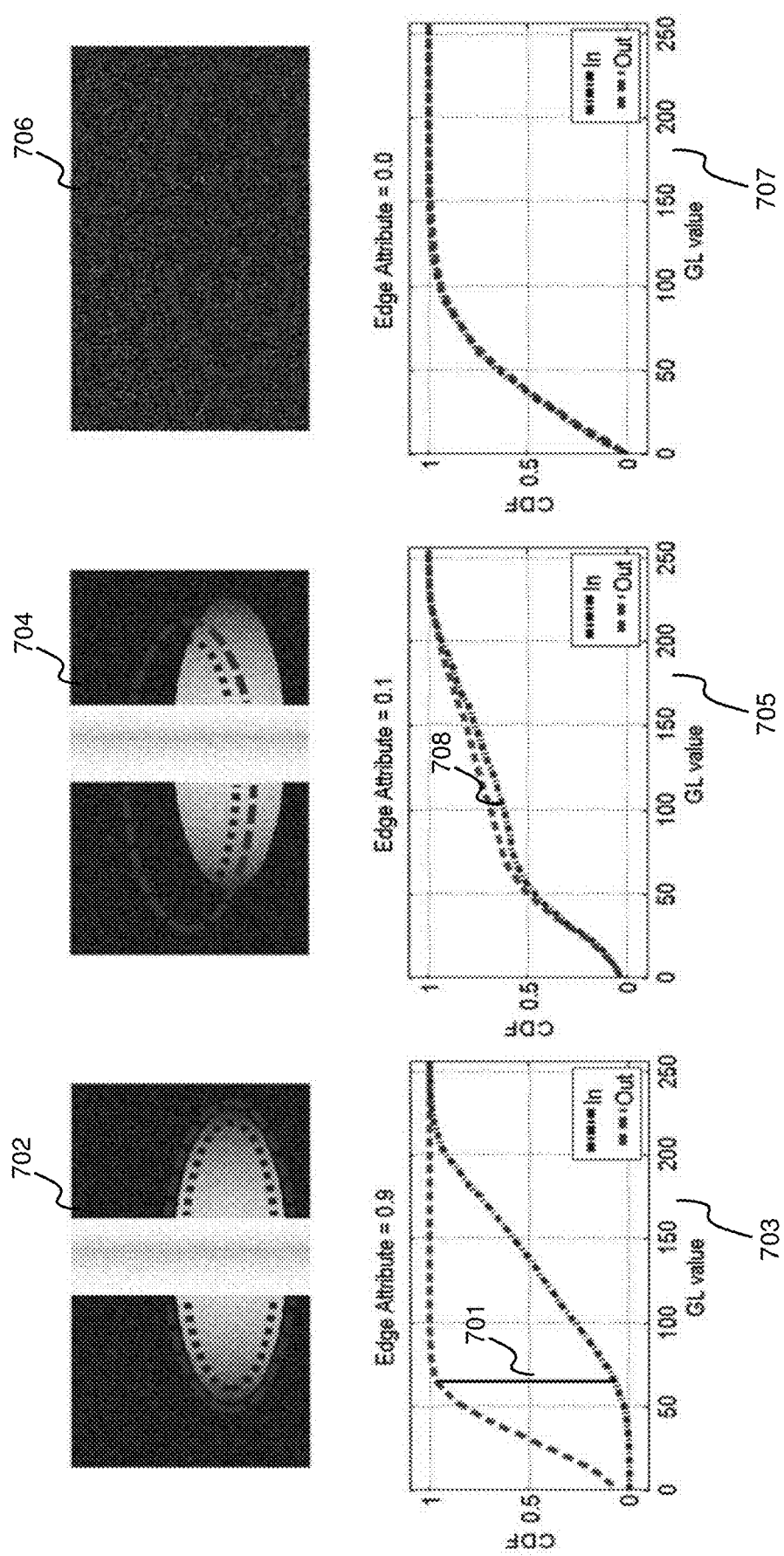
FIG. 7 illustrates schematically how the edge attribute is used for testing edge existence in accordance with certain embodiments of the presently disclosed subject matter.

Referring to FIG. 7, there is illustrated schematically how the edge attribute is used for testing edge existence in accordance with certain embodiments of the presently disclosed subject matter.

As shown in the examples of 702, 704 and 706, a strip of pixels are taken from both sides of the estimated edge in the FP image (illustrated as two dashed lines from the inside and outside of the estimated edge location), and a statistical test is applied between the two pixel populations to test the separation therebetween: the better the separation, the higher the probability of edge existence in the estimated location. One possible test that can be applied is the Kolmogorov-Smirnov (K-S) test. The K-S test quantifies a maximal distance between a distribution function (normalized Cumulative Distribution Functions (CDF) as illustrated in the present example) of two populations, and the distance can be indicative of the separation between the two populations.

For instance, image 702 shows that in cases where the image polygon edge matches the CAD polygon edge, i.e., there is indeed an edge in the FP image at the location of CAD polygon edge, the edge attribute as calculated by the K-S test shows a large separation between the two populations (e.g., the vertical line 701 illustrated corresponds to the maximal distance between the two curves in the corresponding graph 703). Whereas in image 704, where a misregistration between the estimated edge and the actual edge in the FP image is illustrated, and in image 706, where a bare image with no polygons and no edges is illustrated, the edge attribute as calculated by the K-S test shows a small separation or no separation between the two populations (e.g., the vertical line 708 which corresponds to the maximal distance between the two curves shows a minor separation between the two curves in the corresponding graph 705, while the two curves are almost overlapped in the corresponding graph 707).

Therefore, by using an edge attribute calculated as such, an estimation can be made whether there is indeed an edge existing in the FP image at the location of the CAD polygon edge.

According to certain embodiments, optionally, for each design-based structural element associated with a given layer, one or more profile attributes associated with the design-based structural element can be calculated, in addition to the edge attribute.

Specifically, in some embodiments, a gray level (GL) profile for each design-based structural element can be calculated along a specific direction at a location in the first image that corresponds to the location of the design-based structural element in the second image. Once the GL profile is obtained for each design-based structural element, a baseline GL profile can be calculated for each family of design-based structural elements among the validly registered design-based structural elements. The calculation of the baseline can be along the specific direction in the first image, based on the GL profile of each design-based structural element in the family. For instance, the baseline can be calculated by averaging over the GL profile of each design-based structural element in the family. A family of design-based structural elements comprises equivalent design-based structural elements that share the same design pattern. For example, the ellipse-shaped polygons in 406 of FIG. 4 belong to one family, and the column-shaped polygons belong to another family. In some cases, a given layer may contain one or more families of design-based structural elements.

Once the baseline GL profile is created, a profile attribute can be calculated for each design-based structural element, indicative of a difference between the gray level profile thereof and the baseline gray level profile.

Figure 8:
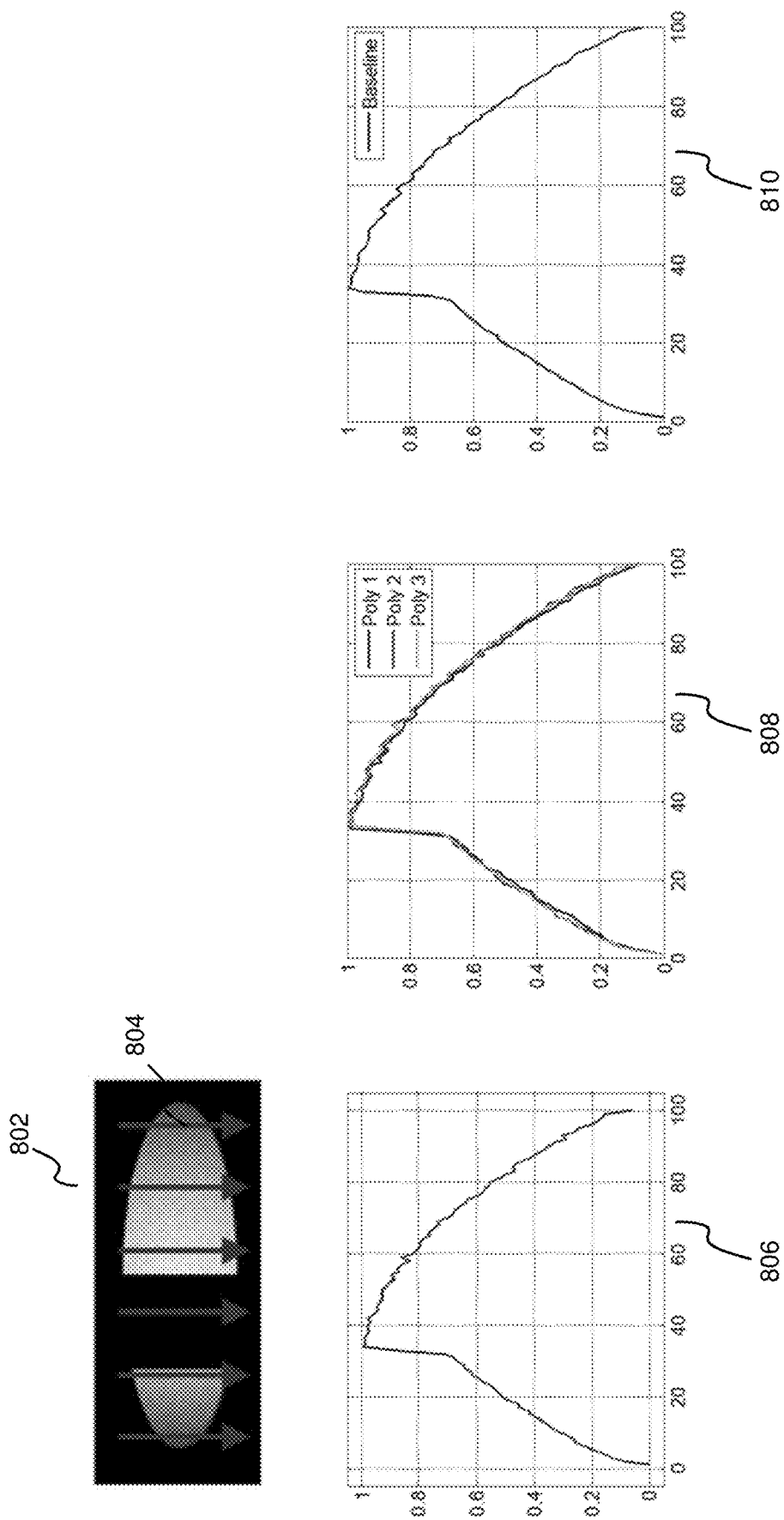
FIG. 8 illustrates an example of calculation of GL profiles and a baseline GL profile in accordance with certain embodiments of the presently disclosed subject matter.

Referring now to FIG. 8, there is illustrated an example of calculation of GL profiles and a baseline GL profile in accordance with certain embodiments of the presently disclosed subject matter.

In 802 there is exemplified an FP image of a single ellipse-shaped polygon. Since the location in the FP image to calculate the GL profile should be determined according to the location of the design-based structural element in the CAD simulated image, it is assumed in the present example that the polygon is validly registered between the image and the CAD data, i.e., the location of the image polygon matches the location of the CAD polygon. Therefore, the GL profile should be calculated at the location of the image polygon. As shown, a specific direction/angle 804 (illustrated as parallel chords) is selected along which the profile attribute is calculated. Note that the image of the polygon has been processed by masking out an overlapped part overlapped by another polygon (e.g., a column-shaped polygon) from an upper layer in the original FP image. A GL profile is calculated for the ellipse-shaped polygon along the direction 804, e.g., by averaging the GL values within the polygon along the parallel chords. A resulting GL profile is illustrated in graph 806 (after omitting the information-less chords, i.e., the masked out part).

Once the GL profile is calculated for all equivalent polygons from a given family, such as illustrated in graph 808 where the GL profiles of three polygons are obtained, a baseline GL profile can be calculated based on the GL profiles of the equivalent polygons. For instance, the baseline GL profile can be obtained by averaging over the GL profiles of the three polygons, as illustrated in graph 810. In some cases the GL profiles can be independently normalized in terms of both size (i.e., number of points) and intensity (i.e. gray level) before averaging.

Figure 9:
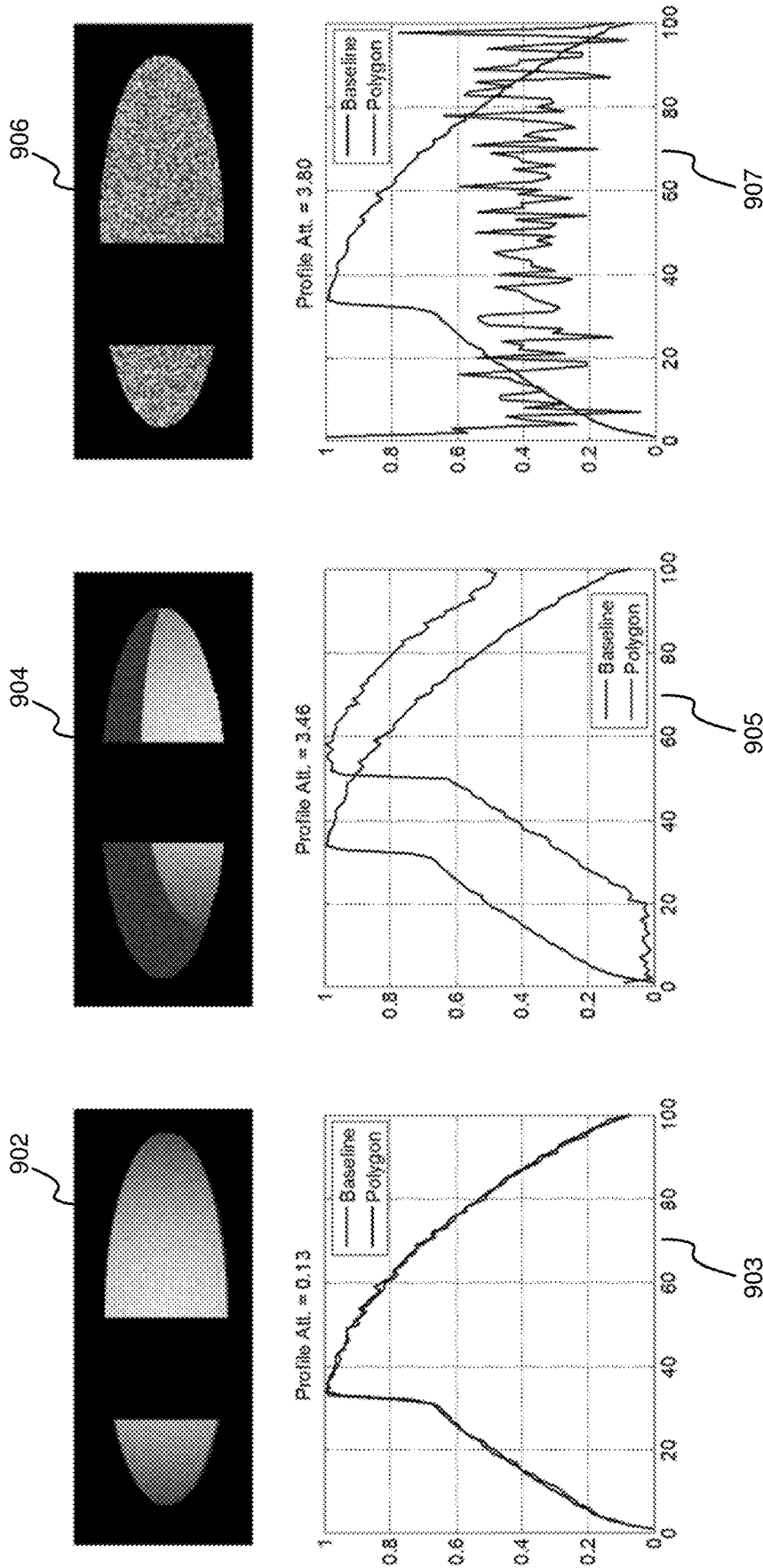
FIG. 9 illustrates a few examples of profile attributes in accordance with certain embodiments of the presently disclosed subject matter.

Referring now to FIG. 9, there are illustrated a few examples of profile attributes in accordance with certain embodiments of the presently disclosed subject matter.

Once the baseline GL profile is created, a profile attribute can be calculated for each design-based structural element. By way of example, the profile attribute can be calculated as a difference between the gray level profile thereof and the baseline gray level profile. For instance, the difference can be a L2 distance between the GL profile and the baseline GL profile. Continuing with the above example of baseline GL profile, there are illustrated three polygons in FIG. 9 with respective profile attributes calculated therefor. In 902 where the polygon is validly registered, the GL profile calculated therefor is illustrated in graph 903 together with the baseline GL profile obtained as described in FIG. 8. It can be seen that the difference between the two curves is relatively small, as proved by the profile attribute which is calculated as 0.13. In 904 where the polygon is misregistered between the image and CAD, the GL profile calculated is distant from the baseline GL profile, as shown in graph 905, and the profile attribute indicative of the difference is relatively large, e.g., 3.46. Similarly, in 906 where the FP image is a bare image with random noise, the GL profile calculated is a random curve, as shown in graph 907, and the profile attribute is calculated as 3.80 which is also relatively large.

It is to be noted that in some cases, a plurality of gray level profiles can be calculated for each design-based structural element along a plurality of specific directions. The plurality of specific directions can be defined by the user. Accordingly, a plurality of baseline GL profiles can be calculated for each family of polygons along the plurality of specific directions. The plurality of baseline GL profiles are included as part of the examination recipe.

Continuing with the description of FIG. 2, once the attribute(s) (e.g., the edge attribute and/or the one or more profile attributes) of the design-based structural elements are obtained, a classifier can be trained (212) (e.g., by the training module 105) using the label of each design-based structural element (as obtained with reference to block 208) associated with a given layer and the attribute(s) associated therewith to determine validity of registration between the first image and the second image at the location of the design-based structural element.

The term "classifier" or "classification model" referred to herein should be broadly construed to cover any learning model capable of identifying to which of a set of categories/classes a new instance belongs, on the basis of a training set of data. The classifier can be implemented as various types of machine learning models, such as, e.g., Linear classifiers, Support vector machines (SVM), neural networks, decision trees, etc. In some cases, the learning algorithm used by the classifier can be supervised learning. In such cases, the training set can contain training instances with labels indicative of categories thereof. FIG. 2 illustrates an example of such a training process. In some other cases, the classifier can use an unsupervised or semi-supervised learning algorithm. The presently disclosed subject matter is not limited to the specific type and/or the learning algorithm of the classifier implemented therewith.

Each design-based structural element can be represented by the attribute(s) associated therewith, such as, e.g., the edge attribute and/or the one or more profile attributes as described above. The design-based structural elements can be projected into an attribute space characterized by the attribute(s). A classifier can be trained based on the attributes of the design-based structural elements in the training set and the labels associated therewith. By way of example, the classifier can be implemented as a binary classifier, such as, e.g., an SVM model, which can be used to determine the decision boundaries in the attribute space, thereby separating validly registered structural elements from invalidly registered structural elements.

Figure 10:
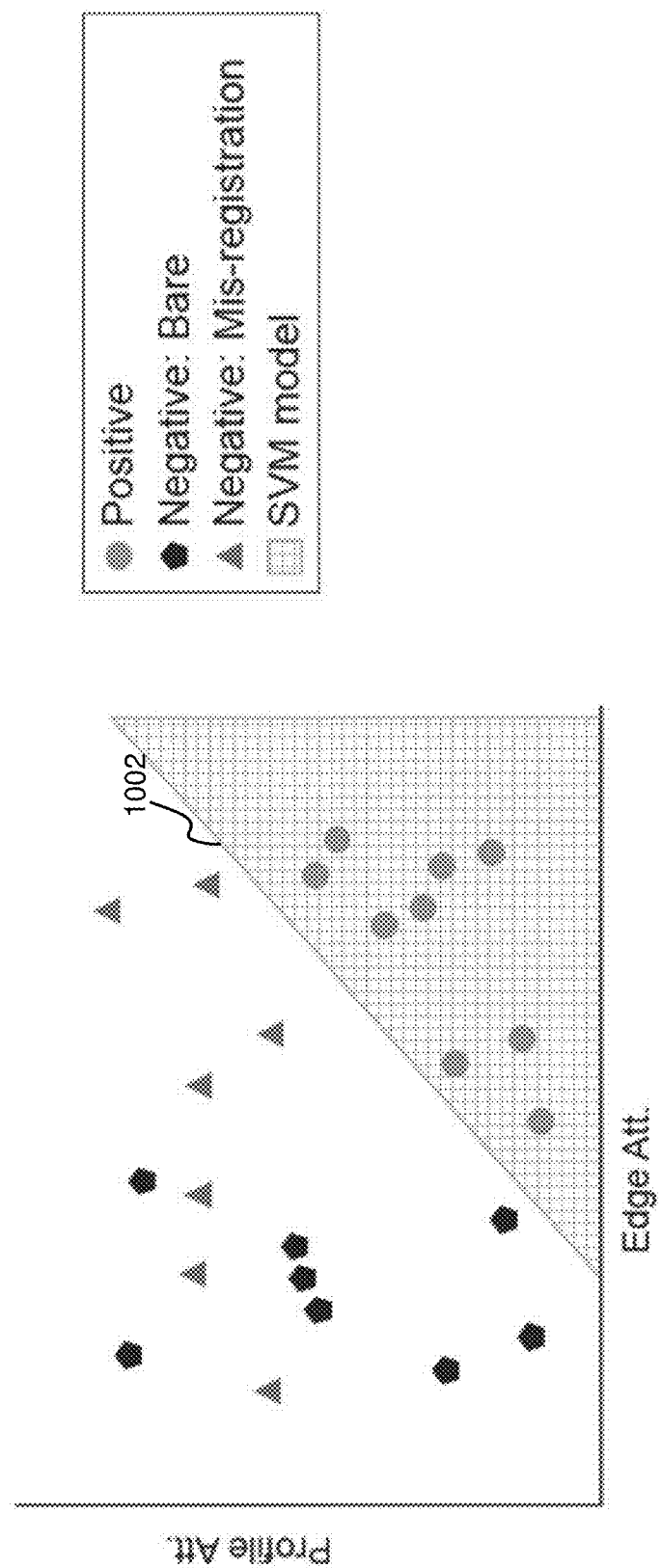
FIG. 10 is a schematic illustration of training a classifier using attributes and labels of the design-based structural elements in accordance with certain embodiments of the presently disclosed subject matter.

Referring to FIG. 10 now, there is shown a schematic illustration of training a classifier using attributes and labels of the design-based structural elements in accordance with certain embodiments of the presently disclosed subject matter.

For each design-based structural element, assume two attributes associated therewith are obtained: an edge attribute and a profile attribute. An attribute space is created and illustrated in FIG. 10 as a coordinate system, with the edge attribute as the X axis and the profile attribute as the Y axis. Each point in the attribute space represents a design-based structural element characterized by the specific attributes thereof. As exemplified, the points marked by dots represent the validly registered structural elements, while the rest of the points represent invalidly registered structural elements, including the points marked by pentagons representing invalid cases caused by the bare image, and the points marked by triangles representing invalid cases caused by mis-registration. The attributes of the design-based structural elements can be fed into an SVM model, and the prediction of the SVM model can be compared with the ground truth (e.g., the labels of the design-based structural elements) so as to iteratively adjust and modify parameters of the SVM model until the trained model is able to determine a decision boundary 1002 in the attribute space which can separate validly registered structural elements (e.g., the points marked by circles) from invalidly registered structural elements (e.g., the rest of points) meeting a predefined criterion.

It is to be noted that the classifier as above described is trained based on the design-based structural elements in a given layer. Therefore the classifier is also referred to as a per-layer classifier. The per-layer classifier for each layer is included as part of the examination recipe.

Since the classifier is trained for classifying at a polygon level and a decision of validity has to be made for each layer, a layer score and a layer threshold are calculated. Specifically, the trained classifier can be used (214) to determine a class for each design-based structural element associated with the given layer of each image pair based on the attribute(s) associated therewith. A layer score for the given layer can be generated based on the determined class for each design-based structural element. A layer threshold can be generated (216) (e.g., by the recipe generator 107) based on the layer score of the given layer of each image pair of the training set. The layer threshold for each layer can be included as part of the examination recipe.

Figure 11:
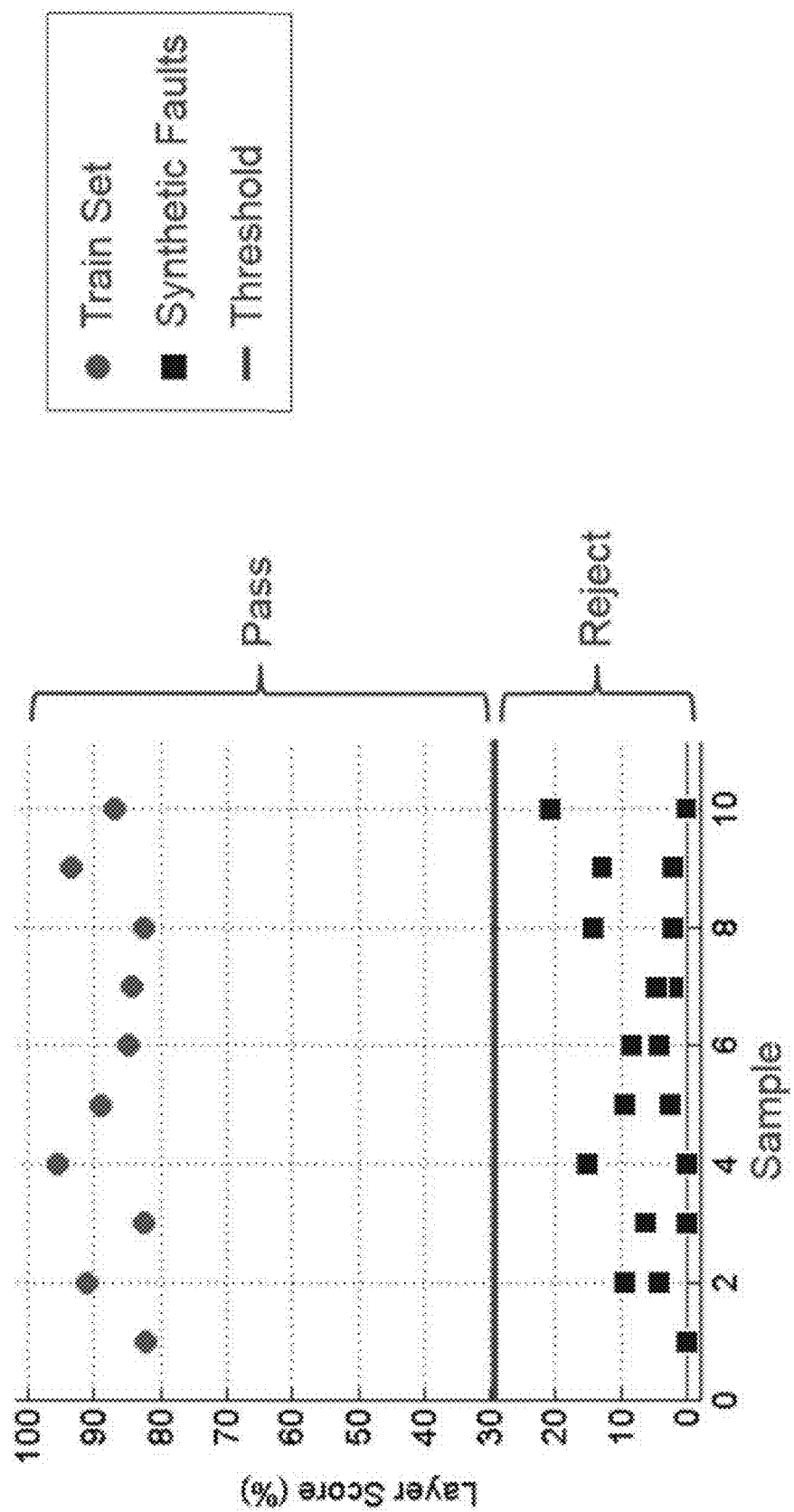
FIG. 11 illustrates a schematic graph of generating a layer threshold in accordance with certain embodiments of the presently disclosed subject matter.

Referring now to FIG. 11, there is illustrated a schematic graph of generating a layer threshold in accordance with certain embodiments of the presently disclosed subject matter.

In the present example, a trained classifier for a given layer can be applied on polygons of the given layer of ten first image pairs in the first subset (i.e., validly registered image pairs), as well as the corresponding artificial image pairs (i.e., invalidly registered image pairs) created in the second subset (assuming one or more artificial image pairs are created for each one first image pair). By way of example, a layer score (L) for a layer i can be calculated as, e.g., the percentage of passed polygons (i.e., classified as valid registration) in the total number of polygons of the given layer: $Li=N_{pass}/N_{poly}$ A layer score is generated for the given layer of each of the image pairs. The layer score for the ten validly registered image pairs are supposedly relatively high and close to 1, as represented by the circles in FIG. 11 whose values range between 80% to 100%. On the other hand, the layer score for the invalidly registered image pairs are supposedly relatively low, as represented by the squares in FIG. 11 whose values range between 0% to 20%.

A layer threshold can be generated based on the layer scores of the image pairs. For instance, the layer threshold can be determined so that the accuracy rate of the classification is maintained. In the present example, the threshold is determined to be slightly above the layer scores of the invalid image pairs so as not to miss any validly registered image pair.

The trained classifier and the layer threshold associated with the given layer can be included (218) (e.g., by the recipe generator 107) in the examination recipe.

According to certain embodiments, the second image (e.g., the CAD simulated image) in each image pair is informative of one or more design-based structural elements associated with a plurality of layers. Accordingly, the labeling of polygons, attribute calculation, training of classifier, generation of layer score and layer threshold, as well as recipe generation, are performed for each of the plurality of layers, giving rise to a plurality of examination recipes corresponding to the plurality of layers. The examination recipe(s) generated as such can be used for examining a specimen as will be described below with reference to FIG. 3.

Figure 3:
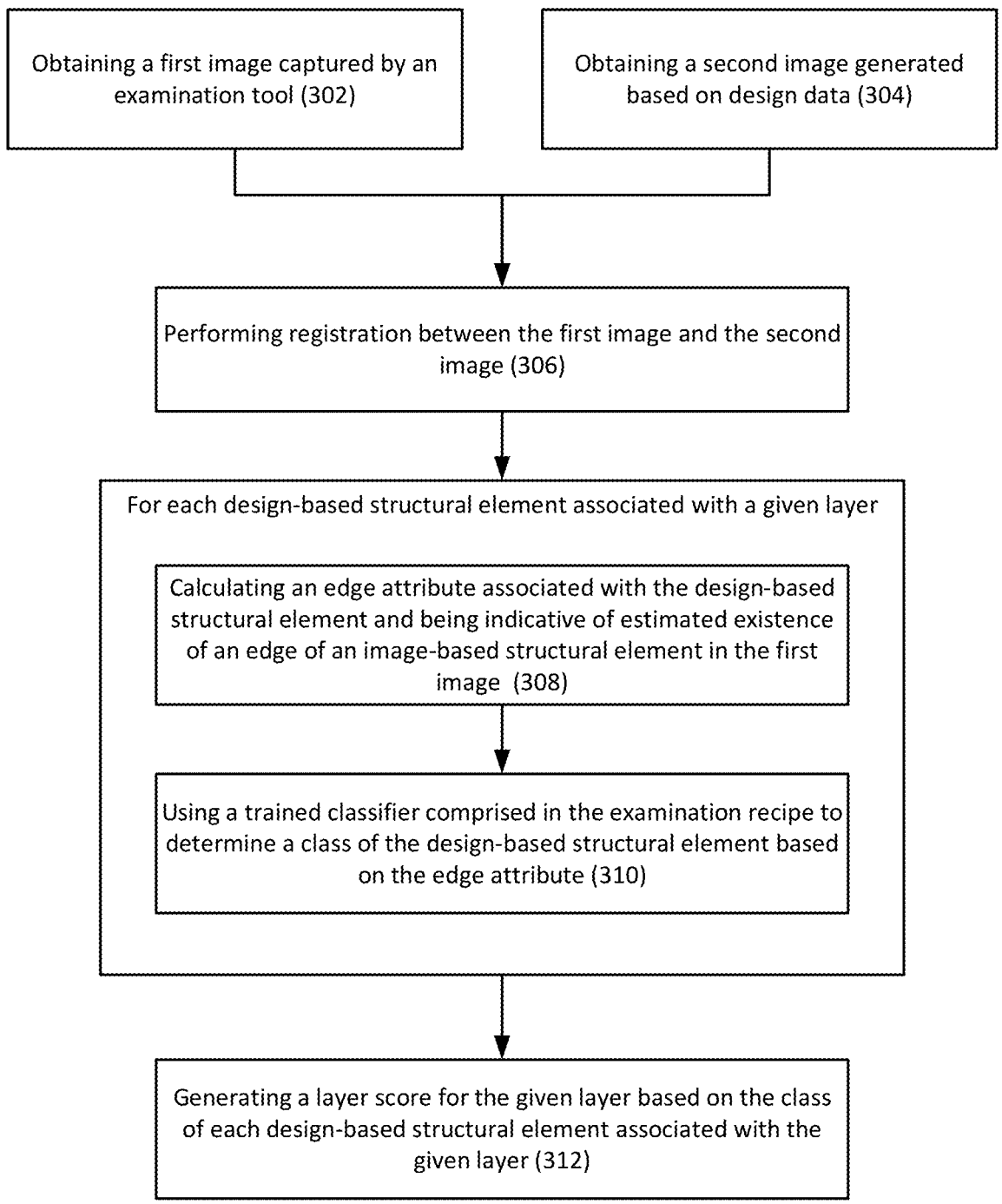
FIG. 3 illustrates a generalized flowchart of examination of a semiconductor specimen using an examination recipe in accordance with certain embodiments of the presently disclosed subject matter.

Referring now to FIG. 3, there is illustrated a generalized flowchart of examination of a semiconductor specimen using an examination recipe in accordance with certain embodiments of the presently disclosed subject matter.

A registered image pair including a first image and a second can be obtained in runtime. According to certain embodiments, the first image can be obtained (302), e.g., by capturing by an examination tool in runtime. The first image can be representative of at least a portion of the semiconductor specimen. The second image can be generated (304) based on design data characterizing the at least portion of the specimen. The second image can be informative of one or more design-based structural elements presented in the design data and a respective layer associated with each design-based structural element.

As described above with reference to FIG. 2, the first image can be a FP image captured by an examination tool. By way of example, the first image can be a high-resolution image captured by a review tool, such as, e.g., a scanning electron microscope (SEM) image captured by a SEM machine. The second image can be a simulated image generated by performing simulation on the design data, such as, e.g., a CAD simulated image. The second image can comprise one or more layers corresponding to the design layers in design data. Each layer can be regarded as a binary image in which the design-based structural elements are separated from the background. Each design-based structural element can be associated with a respective layer in which the element resides. The first image and the second image are registered (306) in a similar manner as described above with reference to FIG. 4.

It is to be noted that although blocks 302, 304 and 306 are illustrated as part of FIG. 3, in some embodiments, the functionality (or at least part thereof) of these processes can be performed externally to system 131 and in advance of the presently proposed examination method as described in FIG. 3. In some other embodiments, such functionalities can be performed by system 131 and thus can be regarded as part of the current examination flow.

For each design-based structural element associated with a given layer, an edge attribute associated with the design-based structural element can be calculated (308) (e.g., by the attribute generator 134). As described above, the edge attribute can be indicative of estimated existence of an edge of an image-based structural element in the first image at a location of an edge of a design-based structural element in the second image. By way of example, the edge attribute can be calculated by applying a statistical test between two pixel populations from both sides of the edge of the design-based structural element in the first image, and determining separation between the two pixel populations based on result of the statistical test. Further details of edge attribute calculation and the usage thereof for determining edge existence are described above with reference to FIG. 2 and FIG. 7.

In some embodiments, additionally, one or more gray level profiles can be calculated along one or more specific directions at a location in the first image which corresponds to a location of the design-based structural element in the second image. One or more profile attributes associated with the design-based structural element can be calculated. Each profile attribute is indicative of a difference between a respective gray level profile thereof and a respective baseline gray level profile comprised in the examination recipe. The respective baseline gray level profile is calculated during the training phase along a respective specific direction for a family of design-based structural elements which the design-based structural element belongs to, as described above with reference to FIG. 2, and FIGS. 8 and 9.

A trained classifier, which was trained during the training phase and comprised in the examination recipe, can be used (310) (e.g., by the validity determination module 138) to determine a class of the design-based structural element based on the attribute(s) (e.g., the edge attribute and/or the one or more profile attributes) associated therewith. The class can be indicative of validity of registration between the first image and the second image at the location of the design-based structural element (also referred to as validity of registration of the design-based structural element).

As aforementioned, the classifier referred to herein should be broadly construed to cover any learning model capable of identifying to which of a set of categories/classes a new instance belongs, on the basis of a training set of data. The classifier can be implemented as various types of machine learning models, and utilize different kinds of learning algorithms. In some embodiments, the trained classifier used in block 310 can be a supervised learning model, such as, e.g., the classifier created and trained as described in FIG. 2. In some other embodiments, the trained classifier used in block 310 can also be an unsupervised or semi-supervised learning model, such as, e.g., clustering model, anomaly detection model, etc. The presently disclosed subject matter is not limited to the specific type of the classifier and/or the learning algorithm implemented therewith.

A layer score can be generated (312) (e.g., by the validity determination module 138) for the given layer based on the class of each design-based structural element associated with the given layer. By way of example, the layer score can be calculated as a percentage of the design-based structural elements that are classified as validly registered. The layer score is usable to determine validity of the registered image pair based on a layer threshold predetermined in the examination recipe. By way of example, in cases where the specimen has only one layer, the validity of the registered image pair can be determined based on the layer score with respect to the layer threshold.

By way of another example, in cases where the specimen has multiple layers, and the second image is informative of one or more design-based structural elements associated with a plurality of layers, the calculation of attribute(s), classification using a trained classifier and layer score generation are performed for each of the plurality of layers, giving rise to a plurality of layer scores. Validity of the registered image pair can be determined based on the plurality of layer scores and a plurality of layer thresholds predetermined in the examination recipe. For instance, one determination criterion can be that the validity of the registered image pair can be denied if any of the layers is not validly registered (i.e., if the layer score of any layer does not meet a criterion with respect to the layer threshold). In other words, the site represented by the image pair as a whole is rejected if any layer score is below its layer threshold. On the other hand, the validity of the registered image pair can be confirmed if all the layers are validly registered (i.e., if the layer scores of all layers meet a criterion with respect to the respective layer thresholds). The layer result and/or the site result can be saved in the storage unit and/or presented on the GUI for the user to review.

Figure 12:
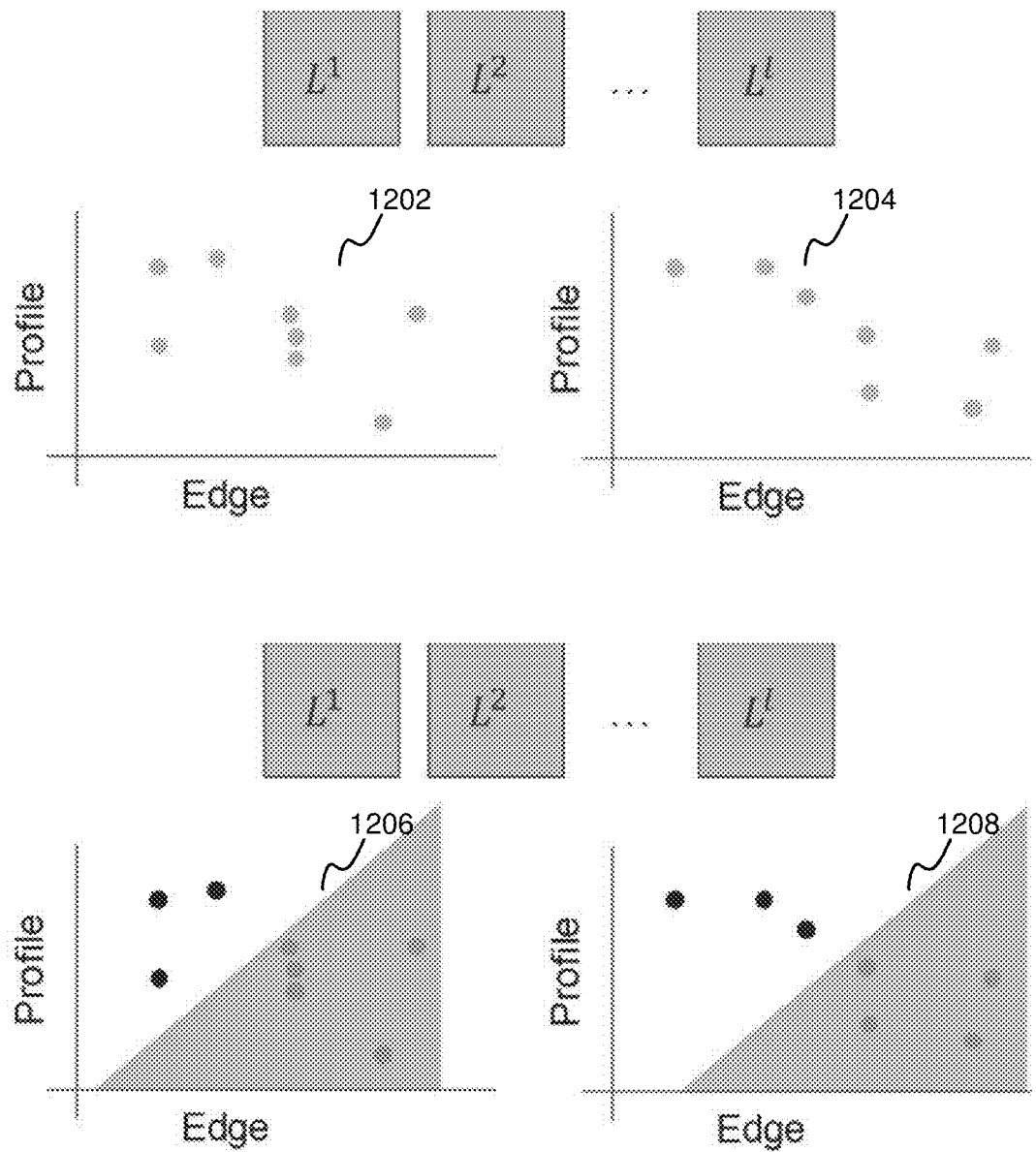
FIG. 12 illustrates schematically an example of runtime examination of a specimen using an examination recipe in accordance with certain embodiments of the presently disclosed subject matter.

Referring to FIG. 12 now, there is schematically illustrated an example of runtime examination of a specimen using an examination recipe in accordance with certain embodiments of the presently disclosed subject matter.

Assuming a specimen has multiple layers $L^1, L^2, \ldots L^l$ as illustrated. Similarly as in the example of FIG. 10, two attributes (an edge attribute and a profile attribute) are obtained for each design-based structural element in each layer, thereby creating an attribute space for each layer (illustrated in FIG. 12 with the edge attribute as the X axis and the profile attribute as the Y axis). For exemplary purposes, two attribute spaces 1202 and 1204 are illustrated, corresponding to two layers. The points in the attribute space represent respective design-based structural elements in a given layer characterized by the specific attributes thereof.

The attributes of the design-based structural elements in a given layer can be fed into a classifier trained for the given layer. The trained classifier can determine a class of each design-based structural element based on the attributes associated therewith. The class is a binary class indicative of validity of registration of the design-based structural element. The decision boundaries 1206 and 1208 represent the separation between the validly registered structural elements and invalidly registered structural elements.

A layer score is calculated for each layer $L^1, L^2, \ldots L^l$ accordingly and a decision can be made for each layer based on the layer score and a layer threshold predetermined in the examination recipe. The validity of the registered image pair can be determined based on the decisions for the respective layers.

It is to be noted that the illustrated examples are described herein for illustrative purposes, and should not be regarded as limiting the present disclosure in any way. Other suitable examples can be used in addition to, or in lieu of, the above.

Among advantages of certain embodiments of the examination process as described herein is being able to automatically detect the mismatch/discrepancy between the FP image and the corresponding design data before performing further examination operations, such as, e.g., segmentation and metrology measurements, etc., thereby enabling to provide to users with trustworthy examination results (e.g., the measurements, such as, overlay, CD, etc.), and avoiding providing misleading examination information to the manufacturing process.

Among advantages of certain embodiments of the recipe generation process as described herein is providing an examination recipe usable to automatically detect the mismatch/discrepancy between the FP image and the corresponding design data before performing further examination operations, as described above.

Among advantages of certain embodiments of the examination process as described herein is an automated examination process for detecting discrepancy between the FP image and the corresponding design data, which can save the user the effort of manually inspecting all sites on the wafer prior to examination, or inspecting the examination results for the entire wafer post-examination in order to look for outliers. This is enabled at least by using a trained classifier to perform classification on the structural elements based on one or more attributes of the structural elements and generating an indication of the site based on the classification results.

Among advantages of certain embodiments of the recipe generation process as described herein is generating a training set including creating an artificial/synthetic faulty training subset by modifying the valid/good training subset in such a way so as to provide adequate labeled training data.

The examination process as presently disclosed herein can be used for different applications, such as, e.g., ADC, ADR, defect detection, matching, metrology and other examination tasks.

It is to be understood that the present disclosure is not limited in its application to the details set forth in the description contained herein or illustrated in the drawings.

It will also be understood that the system according to the present disclosure may be, at least partly, implemented on a suitably programmed computer. Likewise, the present disclosure contemplates a computer program being readable by a computer for executing the method of the present disclosure. The present disclosure further contemplates a non-transitory computer-readable memory tangibly embodying a program of instructions executable by the computer for executing the method of the present disclosure.

The present disclosure is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the present disclosure as hereinbefore described without departing from its scope, defined in and by the appended claims.

The invention claimed is:

1. A computerized system of examination of a semiconductor specimen using an examination recipe, the system comprising a processor and memory circuitry (PMC) configured to:

obtain a registered image pair including a first image captured by an examination tool and representative of at least a portion of the semiconductor specimen, and a second image generated based on design data characterizing the at least portion of the specimen, the second image informative of one or more design-based structural elements presented in the design data and a respective layer associated with each design-based structural element;

for each design-based structural element associated with a given layer:

calculate an edge attribute associated with the design-based structural element and being indicative of estimated existence of an edge of an image-based structural element in the first image at a location of an edge of a design-based structural element in the second image; and use a trained classifier comprised in the examination recipe to determine a class of the design-based structural element based on the edge attribute associated therewith, the class indicative of validity of registration between the first image and the second image at the location of the design-based structural element; and generate a layer score for the given layer based on the class of each design-based structural element associated with the given layer, the score usable to determine validity of the registered image pair based on a layer threshold predetermined in the examination recipe.

2. The computerized system of claim 1, wherein the first image is a high-resolution image captured by a review tool.

3. The computerized system of claim 1, wherein the second image is generated by performing simulation on the design data.

4. The computerized system of claim 1, wherein the PMC is further configured to, for each design-based structural element associated with the given layer:

calculate one or more gray level profiles along one or more specific directions at a location in the first image which corresponds to a location of the design-based structural element in the second image; and calculate one or more profile attributes associated with the design-based structural element, each being indicative of a difference between a respective gray level profile thereof and a respective baseline gray level profile comprised in the examination recipe, the respective baseline gray level profile being calculated along a respective specific direction for a family of design-based structural elements to which the design-based structural element belongs;

wherein the using of the trained classifier to determine the class is based on the edge attribute and the one or more profile attributes associated therewith.

5. The computerized system of claim 1, wherein the PMC is configured to calculate the edge attribute by applying a statistical test between two pixel populations from both sides of the edge of the design-based structural element in the first image, and determining a separation between the two pixel populations based on a result of the statistical test.

6. The computerized system of claim 1, wherein the layer score is a percentage of the design-based structural elements that are classified as validly registered.

7. The computerized system of claim 1, wherein the second image is informative of one or more design-based structural elements associated with a plurality of layers, and the calculating, using and generating are performed for each of the plurality of layers, giving rise to a plurality of layer scores, and wherein the PMC is further configured to determine validity of the registered image pair based on the plurality of layer scores and a plurality of layer thresholds predetermined in the examination recipe.

8. A computerized method of examination of a semiconductor specimen using an examination recipe, the method performed by a processor and memory circuitry (PMC), the method comprising:

obtaining a registered image pair including a first image captured by an examination tool and representative of at least a portion of the semiconductor specimen, and a second image generated based on design data characterizing the at least a portion of the specimen, the second image informative of one or more design-based structural elements presented in the design data and a respective layer associated with each design-based structural element;

for each design-based structural element associated with a given layer:

calculating an edge attribute associated with the design-based structural element and being indicative of estimated existence of an edge of an image-based structural element in the first image at a location of an edge of a design-based structural element in the second image; and using a trained classifier comprised in the examination recipe to determine a class of the design-based structural element based on the edge attribute associated therewith, the class indicative of validity of registration between the first image and the second image at the location of the design-based structural element; and generating a layer score for the given layer based on the class of each design-based structural element associated with the given layer, the score usable to determine validity of the registered image pair based on a layer threshold predetermined in the examination recipe.

9. The computerized method of claim 8, wherein the first image is a high-resolution image captured by a review tool.

10. The computerized method of claim 8, wherein the second image is generated by performing simulation on the design data.

11. The computerized method of claim 8, further comprising, for each design-based structural element associated with the given layer:

calculating one or more gray level profiles along one or more specific directions at a location in the first image which corresponds to a location of the design-based structural element in the second image; and calculating one or more profile attributes associated with the design-based structural element, each being indicative of a difference between a respective gray level profile thereof and a respective baseline gray level profile comprised in the examination recipe, the respective baseline gray level profile being calculated along a respective specific direction for a family of design-based structural elements to which the design-based structural element belongs;

wherein the using of the trained classifier to determine the class is based on the edge attribute and the one or more profile attributes associated therewith.

12. The computerized method of claim 8, wherein the edge attribute is calculated by applying a statistical test between two pixel populations from both sides of the edge of the design-based structural element in the first image, and determining separation between the two pixel populations based on a result of the statistical test.

13. The computerized method of claim 8, wherein the layer score is a percentage of the design-based structural elements that are classified as validly registered.

14. The computerized method of claim 8, wherein the second image is informative of one or more design-based structural elements associated with a plurality of layers, and the calculating, using and generating are performed for each of the plurality of layers, giving rise to a plurality of layer scores, and the method further comprises determining validity of the registered image pair based on the plurality of layer scores and a plurality of layer thresholds predetermined in the examination recipe.

15. A non-transitory computer readable storage medium tangibly embodying a program of instructions that, when executed by a computer, cause the computer to perform a method of examination of a semiconductor specimen using an examination recipe, the method comprising:

obtaining a registered image pair including a first image captured by an examination tool and representative of at least a portion of the semiconductor specimen, and a second image generated based on design data characterizing the at least a portion of the specimen, the second image informative of one or more design-based structural elements presented in the design data and a respective layer associated with each design-based structural element;

for each design-based structural element associated with a given layer:
- calculating an edge attribute associated with the design-based structural element and being indicative of estimated existence of an edge of an image-based structural element in the first image at a location of an edge of a design-based structural element in the second image; and
- using a trained classifier comprised in the examination recipe to determine a class of the design-based structural element based on the edge attribute associated therewith, the class indicative of validity of registration between the first image and the second image at the location of the design-based structural element; and
- generating a layer score for the given layer based on the class of each design-based structural element associated with the given layer, the score usable to determine validity of the registered image pair based on a layer threshold predetermined in the examination recipe.

16. A computerized system of generating an examination recipe usable for examination of a semiconductor specimen, the system comprising a processor and memory circuitry (PMC) configured to:
- obtain a training set including: i) a first subset comprising one or more first image pairs, each first image pair including a first image captured by an examination tool and representative of at least a portion of a specimen, and a second image generated based on design data characterizing the at least a portion of the specimen, the first image and the second image being validly registered, the second image informative of one or more design-based structural elements presented in the design data and a respective layer associated with each design-based structural element; and ii) a second subset comprising one or more second image pairs, each second image pair generated by modifying at least one of the first image and the second image in a respective first image pair in the first subset so that the generated second image pair is invalidly registered;
- associate each of one or more design-based structural elements in a second image of each image pair of the training set with a label indicative of validity of registration;
- for each design-based structural element, calculate an edge attribute associated with the design-based structural element and being indicative of estimated existence of an edge of an image-based structural element in the first image at a location of an edge of a design-based structural element in the second image;
- train a classifier using the edge attribute associated with each design-based structural element associated with a given layer and the label thereof to determine validity of registration between the first image and the second image at the location of the design-based structural element;
- use the trained classifier to determine a class for each design-based structural element associated with the given layer of each image pair based on the edge attribute associated therewith, and generating a layer score for the given layer based on the determined class for each design-based structural element;
- generate a layer threshold based on the layer score of the given layer of each image pair of the training set; and
- include the trained classifier and the layer threshold associated with the given layer in the examination recipe.

17. The computerized system of claim 16, wherein at least one second image pair is generated by modifying content of the first image in a first image pair.

18. The computerized system of claim 16, wherein at least one second image pair is generated by modifying a relative position between the first image and the second image in a first image pair.

19. The computerized system of claim 16, wherein the PMC is configured to perform the association based on at least one of: the validity of registration of a corresponding image pair, and the modification in cases where the corresponding image pair is a second image pair.

20. The computerized system of claim 16, wherein the PMC is further configured to:
- calculate a gray level profile for each design-based structural element along a specific direction at a location in the first image which corresponds to a location of the design-based structural element in the second image;
- calculate, along the specific direction, a baseline gray level profile for each family of design-based structural elements among validly registered design-based structural elements, the calculation based on the gray level profile of each design-based structural element in the family; and
- for each design-based structural element, calculate a profile attribute associated therewith and indicative of difference between the gray level profile thereof and the baseline gray level profile, and wherein the training a classifier and using the trained classifier are based on the edge attribute and the profile attribute associated therewith, wherein the examination recipe further includes the baseline gray level profile.

21. The computerized system of claim 20, wherein a plurality of baseline gray level profiles are calculated for each family along a plurality of specific directions and are included in the examination recipe.

22. The computerized system of claim 16, wherein the second image in each image pair is informative of one or more design-based structural elements associated with a plurality of layers, and the associating, calculating, training, using and including are performed for each of the plurality of layers, giving rise to a plurality of examination recipes corresponding to the plurality of layers.

23. A non-transitory computer readable storage medium tangibly embodying a program of instructions that, when executed by a computer, cause the computer to perform a method of generating an examination recipe usable for examination of a semiconductor specimen, the method comprising:
- obtaining a training set including: i) a first subset comprising one or more first image pairs, each first image pair including a first image captured by an examination tool and representative of at least a portion of a specimen, and a second image generated based on design data characterizing the at least a portion of the specimen, the first image and the second image being validly registered, the second image informative of one or more design-based structural elements presented in the design data and a respective layer associated with each design-based structural element; and ii) a second subset comprising one or more second image pairs, each second image pair generated by modifying at least one of the first image and the second image in a respective first image pair in the first subset so that the generated second image pair is invalidly registered;

associating each of one or more design-based structural elements in a second image of each image pair of the training set with a label indicative of validity of registration;

for each design-based structural element, calculating an edge attribute associated with the design-based structural element and being indicative of estimated existence of an edge of an image-based structural element in the first image at a location of an edge of a design-based structural element in the second image;

training a classifier using the edge attribute associated with each design-based structural element associated with a given layer and the label thereof to determine validity of registration between the first image and the second image at the location of the design-based structural element;

using the trained classifier to determine a class for each design-based structural element associated with the given layer of each image pair based on the edge attribute associated therewith, and generating a layer score for the given layer based on the determined class for each design-based structural element;

generating a layer threshold based on the layer score of the given layer of each image pair of the training set; and including the trained classifier and the layer threshold associated with the given layer in the examination recipe.

24. The non-transitory computer readable storage medium of claim 23, wherein at least one second image pair is generated by modifying content of the first image in a first image pair.

25. The non-transitory computer readable storage medium of claim 23, wherein at least one second image pair is generated by modifying a relative position between the first image and the second image in a first image pair.

26. The non-transitory computer readable storage medium of claim 23, wherein the associating is performed based on at least one of: the validity of registration of a corresponding image pair, and the modification in cases where the corresponding image pair is a second image pair.

27. The non-transitory computer readable storage medium of claim 23, wherein the method further comprises:

calculating a gray level profile for each design-based structural element along a specific direction at a location in the first image which corresponds to a location of the design-based structural element in the second image;

calculating, along the specific direction, a baseline gray level profile for each family of design-based structural elements among validly registered design-based structural elements, the calculation based on the gray level profile of each design-based structural element in the family; and for each design-based structural element, calculating a profile attribute associated therewith and being indicative of a difference between the gray level profile thereof and the baseline gray level profile, and wherein the training a classifier and using the trained classifier are based on the edge attribute and the profile attribute associated therewith, and wherein the examination recipe further includes the baseline gray level profile.

28. The non-transitory computer readable storage medium of claim 27, wherein a plurality of baseline gray level profiles are calculated for each family along a plurality of specific directions and are included in the examination recipe.

29. The non-transitory computer readable storage medium of claim 23, wherein the second image in each image pair is informative of one or more design-based structural elements associated with a plurality of layers, and the associating, calculating, training, using and including are performed for each of the plurality of layers, giving rise to a plurality of examination recipes corresponding to the plurality of layers.

* * * * *